(12) United States Patent
Kanai

(10) Patent No.: US 12,373,149 B2
(45) Date of Patent: Jul. 29, 2025

(54) COMMUNICATION TERMINAL, CONTROL METHOD OF COMMUNICATION TERMINAL, AND STORAGE MEDIUM

(71) Applicant: CANON KABUSHIKI KAISHA, Tokyo (JP)

(72) Inventor: Yasunori Kanai, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/411,646

(22) Filed: Jan. 12, 2024

(65) Prior Publication Data

US 2024/0143256 A1    May 2, 2024

Related U.S. Application Data

(63) Continuation of application No. 17/392,091, filed on Aug. 2, 2021, now Pat. No. 11,922,085, which is a continuation of application No. 17/239,396, filed on Apr. 23, 2021, now Pat. No. 11,507,335, which is a continuation of application No. 16/711,154, filed on (Continued)

(30) Foreign Application Priority Data

May 19, 2017    (JP) ................................. 2017-100154

(51) Int. Cl.
*G06F 3/12*    (2006.01)
*H04N 1/00*    (2006.01)
*H04W 8/00*    (2009.01)
*H04W 12/06*   (2021.01)
*H04W 4/80*    (2018.01)

(Continued)

(52) U.S. Cl.
CPC .......... *G06F 3/1292* (2013.01); *G06F 3/1204* (2013.01); *G06F 3/1236* (2013.01); *H04N 1/00137* (2013.01); *H04W 8/005* (2013.01); *H04W 12/06* (2013.01); *G06F 3/121* (2013.01); *H04N 2201/0094* (2013.01); *H04W 4/80* (2018.02); *H04W 12/63* (2021.01); *H04W 88/02* (2013.01)

(58) Field of Classification Search
CPC ............. G06F 3/1204; G06F 17/30873; G06F 3/1222; G06F 3/1288; H04N 1/00503; H04N 1/00411
USPC ........................................................ 358/1.15
See application file for complete search history.

(56) References Cited

U.S. PATENT DOCUMENTS

2015/0062633 A1*  3/2015  Asai ...................... G06F 3/1257
                                                          358/1.15
2015/0085312 A1*  3/2015  Tanimoto ........... H04N 1/00307
                                                          358/1.14

FOREIGN PATENT DOCUMENTS

WO    WO-2016047064 A1 *  3/2016  ........... G06F 3/1203

* cited by examiner

*Primary Examiner* — Neil R McLean
(74) *Attorney, Agent, or Firm* — Canon U.S.A., Inc., IP Division

(57) ABSTRACT

A method of controlling a communication terminal including a near-field communication unit includes setting, as operation settings of the communication terminal, whether to enable wireless communication functions by the near-field communication unit and controlling to display a predetermined notification before displaying a screen for performing a login request upon condition that a user operation to transition to a screen for performing a login request to an external device has been received, and that settings have not been made in the setting of the communication terminal at (Continued)

least to enable wireless communication functions by the near-field communication unit as operation settings of the communication terminal.

16 Claims, 22 Drawing Sheets

Related U.S. Application Data

Dec. 11, 2019, now Pat. No. 11,023,191, which is a continuation of application No. 16/506,297, filed on Jul. 9, 2019, now Pat. No. 10,564,909, which is a continuation of application No. 15/979,224, filed on May 14, 2018, now Pat. No. 10,402,138.

(51) Int. Cl.
*H04W 12/63* (2021.01)
*H04W 88/02* (2009.01)

COMMUNICATION TERMINAL, CONTROL METHOD OF COMMUNICATION TERMINAL, AND STORAGE MEDIUM

CROSS-REFERENCE TO RELATED APPLICATIONS

This application is a continuation of co-pending U.S. patent application Ser. No. 17/392,091, which was filed on Aug. 2, 2021, which is a continuation of U.S. patent application Ser. No. 17/239,396, which was filed on Apr. 23, 2021 (now U.S. Pat. No. 11,507,335 issued on Nov. 22, 2022) and which is a continuation of U.S. application Ser. No. 16/711,154, which was filed on Dec. 11, 2019 (now U.S. Pat. No. 11,023,191 issued on Jun. 1, 2021) and which is a continuation of U.S. application Ser. No. 16/506,297, which was filed on Jul. 9, 2019 (now U.S. Pat. No. 10,564,909 issued on Feb. 18, 2020) and which is a continuation of U.S. patent application Ser. No. 15/979,224, which was filed on May 14, 2018 (now U.S. Pat. No. 10,402,138 issued on Sep. 3, 2019) and which claims priority to Japanese Patent Application No. 2017-100154, which was filed on May 19, 2017. The above referenced applications are hereby incorporated by reference herein in their entireties.

BACKGROUND

Field

The present disclosure relates to a communication terminal that logs into an external device via near-field communication.

Description of the Related Art

Image processing devices provide users with various functions, such as printing functions, copying functions, file transmission functions, and so forth. In a case where a user uses a function that an image processing device provides, the user needs to log into the image processing device. A known technique for user login is to transmit a login request to the image processing device based on a communication terminal, such as a mobile terminal, coming close to the image processing device, whereby the user logs into the image processing device (e.g., Japanese Patent Laid-Open No. 2016-66217).

SUMMARY

A communication terminal that transmits a login request to an external device includes a near-field communication interface, a display device, a memory device that stores instructions, and at least one processor that executes the instructions to cause the communication terminal to perform operations including setting, as operation settings of the communication terminal, whether to enable wireless communication functions by the near-field communication interface, and controlling to display a predetermined notification before displaying a screen for performing the login request, upon condition that a user operation to transition to a screen for performing a login request to an external device has been received, and that settings have not been made at least to enable wireless communication functions by the near-field communication interface as operation settings of the communication terminal.

Further features will become apparent from the following description of exemplary embodiments with reference to the attached drawings.

DESCRIPTION OF THE EMBODIMENTS

The conventional series of login processing using a communication terminal did not take into consideration performing detailed control in a case of performing login processing, such as guidance and error notification regarding a case of the user performing login. An arrangement for improving user convenience in a case of logging in from a communication terminal to an external device will be described below. For example, an arrangement will be described where, in a control sequence for a case where near-field communication settings necessary to login to the image processing device have not been properly set at the communication terminal, the user is enabled to comprehend why login failed. Also, an arrangement will be described where, in a case where settings used for login processing have not been appropriately made, the user is notified before a login request is made, thereby suppressing unnecessary user operations from being performed.

An embodiment for carrying out the present disclosure will be described with reference to the drawings. It should be noted that the following embodiment is not see to be limiting, and that not all of the combination of features described in the embodiment are essential.

First Embodiment

Figure 1:
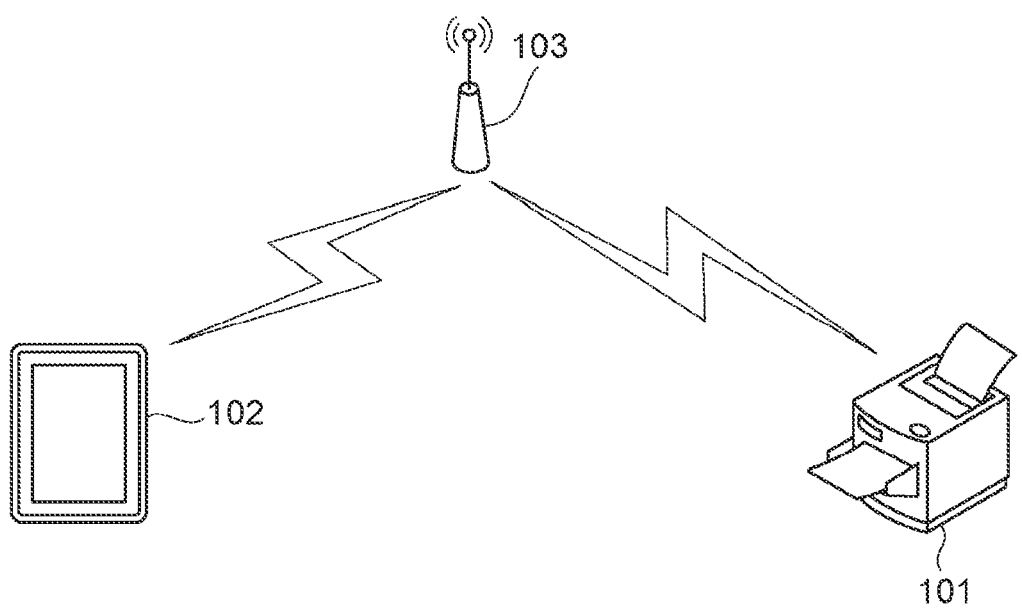
FIG. 1 is a diagram illustrating an overview of a system.

First, the configuration of a communication system according to the present disclosure will be described with reference to FIG. 1. The system according to the present embodiment includes a communication terminal 102, multifunction peripheral (MFP) 101, and an access point (AP) 103.

The communication terminal 102 can perform wireless communication based on the IEEE 802.11 standard (hereinafter referred to as 802.11 standard). The communication terminal 102 can connect to a network that the AP 103 provides by the user inputting a service set identifier (SSID) and security key to the communication terminal 102 for connecting to the AP 103.

The MFP 101 is a multifunction device including functions such as scanning, printing, copying, and so forth. Upon the SSID and security key for connecting to the AP 103 being set as wireless network settings for the MFP 101, the communication terminal 102 and MFP 101 can perform wireless communication via the AP 103. The MFP 101 can receive printing data from the communication terminal 102 via wireless communication and perform printing.

The MFP 101 according to the present embodiment can also perform user authentication management, assuming user login, from a perspective of security. If a user is not logged in, the MFP 101 including user authentication management set to ON is in a state where a login screen is displayed on the operating unit, and the functions that the MFP 101 provides are not available. The MFP 101 determines whether to permit login of a user, based on user authentication information (also referred to as user credentials) received from the user in a state where the login screen is displayed. Once login of the user is permitted, the MFP 101 displays a main screen (also referred to as main menu) on the operating unit of the MFP 101. The user can use the functions that the MFP 101 provides, such as copying and transmission functions, via the main screen displayed on the operating unit. Hereinafter, enabling the user to login and transitioning to a state where the functions that the MFP 101 are used via the operating unit of the MFP 101 will be referred to as local login.

The communication system according to the present embodiment includes mobile cooperation functions, where functions are provided to the user by the communication terminal 102 and the MFP 101 cooperating. For example, a user with the communication terminal 102 can execute a cooperative login function where particular users are logged into the MFP 101 by bringing the communication terminal 102 close to the MFP 101. The communication terminal 102 can perform data communication with the MFP 101 using near-field communication. For example, the communication terminal 102 performs data communication relating to cooperation login using near-field communication.

The MFP 101 and communication terminal 102 can also cooperate to execute scan cooperation functions, where a paper original is scanned, and transmitted or saved. Print release functions can be executed, where a print instruction is provided from the operating unit of the communication terminal 102 regarding print data kept at the MFP 101.

The communication terminal 102 communicates with the MFP 101 via the AP 103. For example, the communication terminal 102 can exchange print data and scan data with the MFP 101 via the AP 103.

The MFP 101 can also operate in an access point mode. In a case of operating in the access point mode, the MFP 101 operates as a software access point. The communication terminal 102 can execute direct wireless communication with the MFP 101 without going through a relay device, such as the AP 103, by connecting to the software AP that the MFP 101 provides. The communication terminal 102 can execute the various types of cooperation functions without going through the AP 103 by connecting to the MFP 101 using direct wireless communication with the MFP 101.

While a smartphone or tablet personal computer (PC) are examples of a communication terminal in the present embodiment, this is not restrictive. Any other communication terminal, such as wearable devices and so forth, which can execute near-field communication can be used.

While an MFP is an example in the present embodiment of an external device that cooperates with the communication terminal, this is not restrictive. For example, single-function scanners, printers, 3D printers, and so forth are also applicable. In addition, videoconferencing system terminals, automotive navigation devices, interactive markerboards, and other home appliances and the like are also applicable.

Communication Terminal

Figure 2:
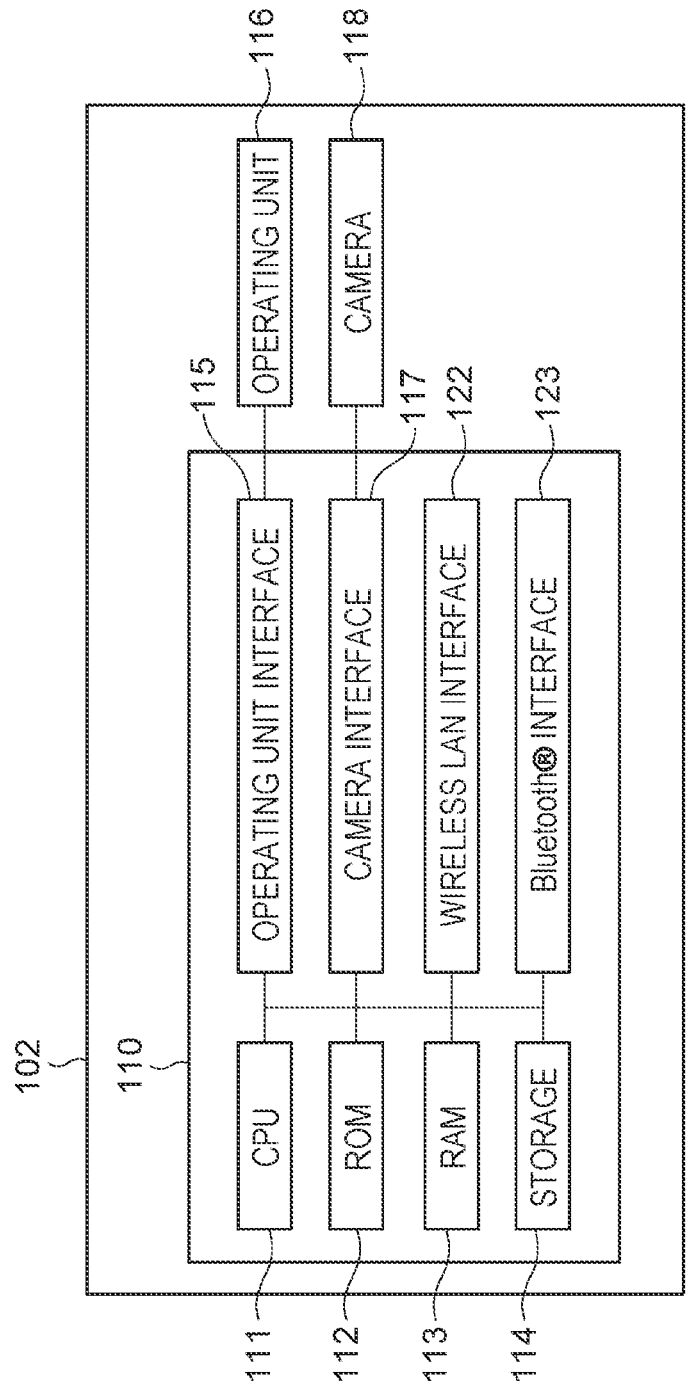
FIG. 2 is a diagram illustrating an example of a hardware configuration of a communication terminal.

The hardware configuration of the communication terminal 102 will be described with reference to FIG. 2. A central processing unit (CPU) 111 included in a control unit 110 reads out control programs stored in read only memory (ROM) 112 or storage 114, and controls the communication terminal 102.

The control unit 110 includes the CPU 111, ROM 112, random access memory (RAM) 113, the storage 114, an operating unit interface 115, and a camera interface 117 connected to the bus. The control unit 110 includes a wireless LAN interface 122 and Bluetooth® interface 123 as communication interfaces for communication with external devices. In the present embodiment, the wireless LAN interface 122 and Bluetooth® interface 123 are described as being separate hardware, but this is not restrictive. An arrangement can be provided where a combo chip that realizes wireless communication by wireless LAN and near-field communication by Bluetooth® by a single hardware arrangement, thereby realizing wireless communication by wireless LAN and near-field communication by Bluetooth®.

The CPU 111 is a central processing unit (processor) that controls operations of the entire control unit 110. The RAM 113 is volatile memory, and is used as work area and a temporary storage region for loading various types of control programs stored in the ROM 112 and storage 114.

The ROM 112 is non-volatile memory, storing a boot program for the communication terminal 102 and so forth. The storage 114 is non-volatile flash memory with a larger storage capacity than the RAM 113. The storage 114 stores programs for controlling the communication terminal 102. A later-described operating system (OS) 300 and a cooperative application 310 are also stored in the storage 114.

When the communication terminal 102 is being activated, the CPU 111 executes the boot program stored in the ROM 112. The boot program is for reading out the programs of the OS 300 stored in the storage 114 and loading into the RAM 113. When the CPU 111 executes the boot program, the programs of the OS 300 loaded into the RAM 113 are then executed, and control of the communication terminal 102 is carried out. The CPU 111 also performs read/write where data used for operation of the control programs is stored in the RAM 113.

While one CPU 111 in the communication terminal 102 executes each process in the later-described flowcharts, this configuration is not limiting. For example, multiple CPUs and microprocessors (MPU) can collaborate to execute each process in the later-described flowcharts. Also, part of the processing can be executed using a hardware circuit such as an ASIC (Application Specific Integrated Circuit) or the like.

The operating unit interface 115 connects the operating unit 116 and control unit 110. The operating unit 116 includes a touch panel that can detect touch operations by a user, and a display panel that displays various types of screens. The operating unit 116 functions as a display unit that displays information, and as an accepting unit that accepts user instructions. The operating unit 116 displays various types of screens that the OS 300 and cooperative application 310 provide. The user can input desired operation instructions to the communication terminal 102 by touching operations using, for example, an object such as the user's finger, on the operating unit 116. The operating unit 116 also includes hardware keys. The user can input operation instructions to the communication terminal 102 by pressing hardware keys.

The camera interface 117 connects the control unit 110 and the camera 118. The camera 118 performs imaging based on imaging instructions by the user. Photographs taken by the camera 118 are stored in a predetermined region in the storage 114.

The wireless LAN interface 122 provides wireless client functions for performing wireless communication conforming to the 802.11 standard. The wireless LAN interface 122 also connects to an external AP and executes wireless communication conforming to the 802.11 standard. The external AP can be the MFP 101 operating in access point mode, or can be the AP 103.

The Bluetooth® interface 123 is an interface for exchanging data with various types of nearby devices by near-field communication. In the present embodiment, a cooperative login function is carried out where particular users are logged into the MFP 101 using wireless communication conforming to Bluetooth® (IEEE 802.15.1), particularly Bluetooth® Low Energy, as an example.

Software Configuration of Communication Terminal

Figure 3:
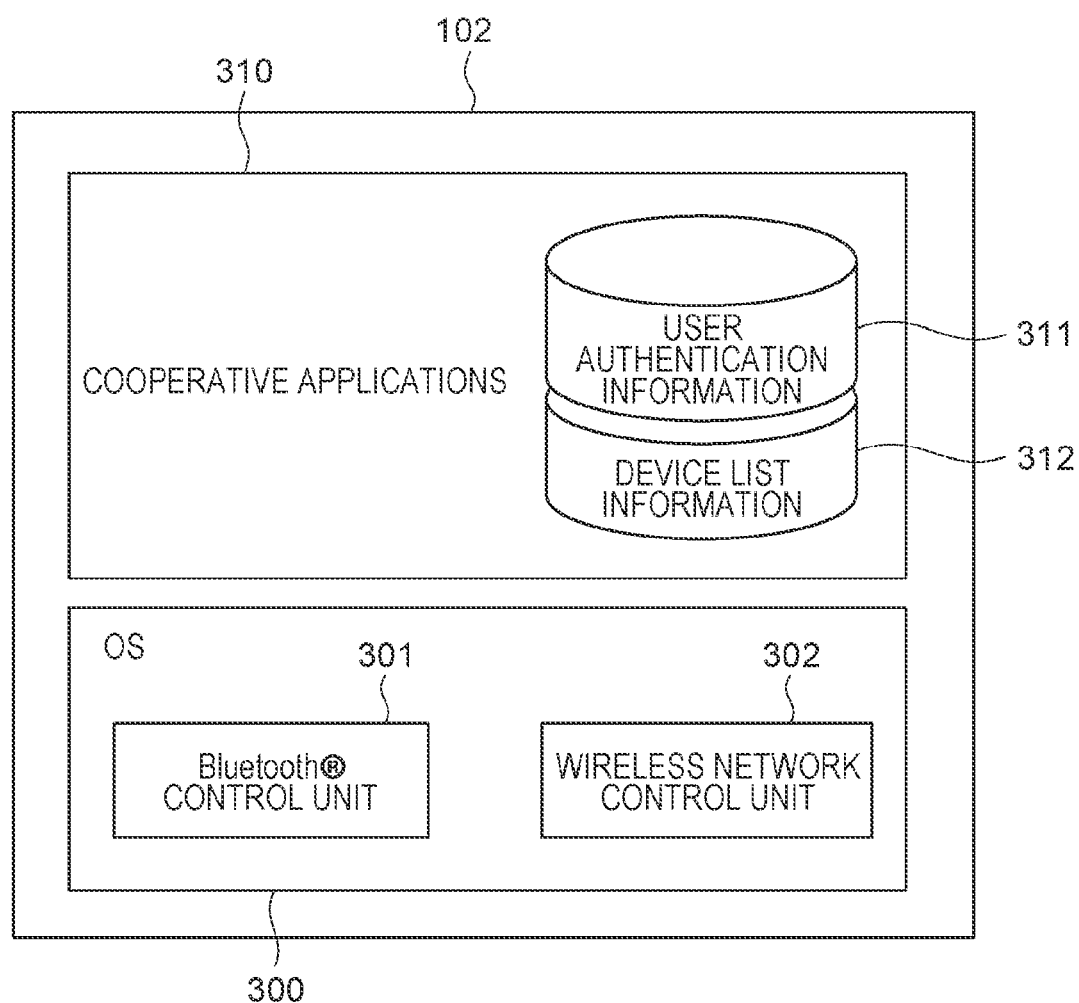
FIG. 3 is a diagram illustrating an example of a software configuration of the communication terminal.

The software configuration of the communication terminal 102 will be described with reference to FIG. 3. FIG. 3 is a function block diagram of software that is realized by the CPU 111 reading out control programs stored in the ROM 112 and storage 114.

The OS 300 is basic software that controls the overall operations of the communication terminal 102. Examples of the OS 300 include Android™ provided by Google LLC, iOS® provided by Apple® Inc., and so forth.

Various applications, including the later-described cooperative application 310, can be installed in the communication terminal 102. The OS 300 can exchange information among these applications, and change screens displayed on an operating panel 205 based on instructions received from the application.

The OS 300 includes a framework for controlling the hardware of the communication terminal 102 from various types of applications, and provides the applications operating on the OS 300 with functions for using the various types of hardware. The OS 300 includes a Bluetooth® control unit 301 and wireless network control unit 302 to control the various types of hardware from the applications. The Bluetooth® control unit 301 interprets instructions from applications, and controls the Bluetooth® interface 123 to control the near-field communication with external terminals.

For example, in a case of exchanging data with an external device (e.g., the MFP 101) by Bluetooth® Low Energy communication, the cooperative application 310 commissions the OS 300 to exchange data with the external device by Bluetooth® Low Energy communication. The Bluetooth® control unit 301 of the OS 300 that has been commissioned realizes Bluetooth® Low Energy communication by controlling the Bluetooth® interface 123. The Bluetooth® control unit 301 also collaborates with the Bluetooth® interface 123 to obtain the received signal strength (RSSI: Received Signal Strength Indicator) of externally-received Bluetooth® signals. The applications call up functions provided by the OS 300 to reference the obtained received signal strength.

The cooperative application 310 can also call up functions provided by the OS as an Application Program Interface (API) or as a framework for applications. The cooperative application 310 can switch APs with which the wireless LAN interface 122 communicates, or control exchange of data by wireless communication conforming to IEEE 802.11, by calling up functions. The wireless network control unit 302 controls wireless communication with external terminals by controlling the wireless LAN interface 122 based on instructions from applications.

The cooperative application 310 stores information as internal information, as denoted by reference numerals 311 and 312. The user authentication information 311 is user authentication information used for a login request to the MFP 101. These sets of user authentication information are set via a settings screen of the cooperative application 310. The device list information 312 stores external devices, such as MFPs and so forth, which can be cooperation partners for the cooperative application 310. The device list stores management information of external devices, such as device name of the external device registered by user operations or the like, capabilities, connection information for connecting to the external device, and so forth. The cooperative application 310 is capable of user search processing of MFPs by a user, registration of external devices such as MFPs in the device list by accepting manual input, and so forth. Upon accepting a user operation of selecting an external device such as an MFP or the like registered in the device list, from a selection screen omitted from illustration, the cooperative application 310 changes the external device which is the cooperation partner to this selected external device.

MFP

Figure 4:
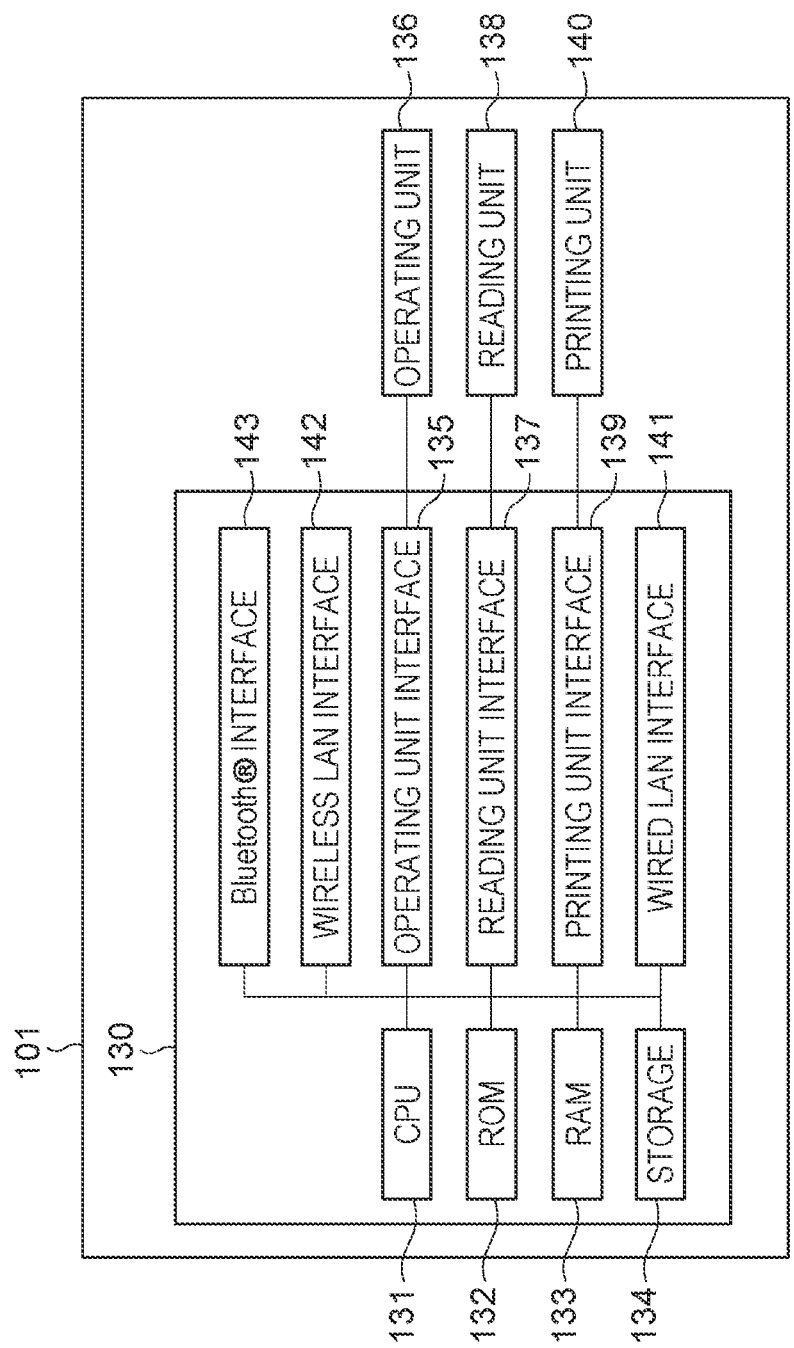
FIG. 4 is a diagram illustrating an example of a hardware configuration of an MFP.

The MFP 101 will now be described. FIG. 4 is a block diagram illustrating the hardware configuration of the MFP 101. The MFP 101 includes reading functions of reading images and printing function of printing images on sheets.

A control unit 130 including the CPU 131 controls the operations of the entire MFP 101. A CPU 131 reads out control programs stored in ROM 132 or storage 134, and carries out various types of control, such as printing control, reading control, and so forth. The ROM 132 stores control programs executable by the CPU 131. RAM 133 is main storage memory for the CPU 131, and is used as a work area or a temporary storage region for loading commands of various types of control programs. The storage 134 is a storage unit that stores print data, image data, various types of programs, and various types of settings information. The storage 134 also stores a user management database for use in a case of performing user authentication management.

In the MFP 101 according to the present embodiment, one CPU 131 executes each process in the later-described flowchart using one memory device (RAM 133), but this configuration is not seen to be limiting. For example, multiple processors, RAM, ROM, and storage can collaborate to execute each process in the later-described flowcharts.

An operating unit interface 135 connects an operating unit 136 and the control unit 130. The operating unit 136 includes a circuit crystal display unit with touch panel functions, various types of hard keys, and so forth, and functions as a display unit that displays information, and as an accepting unit that accepts user instructions.

A reading unit interface 137 connects a reading unit 138 and the control unit 130. The reading unit 138 reads originals and generates read images. The generated read images are transmitted to an external device, used for printing, or the like.

A printing unit interface 139 connects a printing unit 140 and the control unit 130. The printing unit 140 prints images on sheets based on externally generated print data.

The control unit 130 is also connected to a network omitted from illustration, via a wired LAN interface 141. The wired LAN interface 141 transmits images and information to an external device on the network that is omitted from illustration, receives print data and information from the external device, and so forth.

The control unit 130 includes a wireless LAN interface 142 and a Bluetooth® interface 143. The wireless LAN interface 142 provides wireless client functions for connecting to an external AP and performing wireless communication, and functions of a software AP where the MFP 101 behaves as an AP.

The Bluetooth® interface 143 is an interface of exchanging data with the various types of nearby devices via near-field communication. The MFP 101 according to the present embodiment performs communication with the communication terminal 102 using near-field communication conforming to Bluetooth® Low Energy, and uses the communication terminal 102 to execute cooperating login functions where the user is caused to login to the MFP 101.

Cooperative Login Function

The cooperative login function according to the present embodiment will now be described. While methods for a communication terminal and MFP to cooperate to cause a user to log into the MFP have been conceived heretofore, the series of login processing using the conventional communication terminal to detailed control taking convenience of the user has not been taken into consideration. For example, no consideration has been given to a control sequence for a case where near-field communication settings necessary to log into the MFP have not been properly set at the communication terminal and the user cannot comprehend why login has failed. This issue is taken into consideration in the present embodiment, and detailed control that was not given sufficient consideration in the series of login processing using the conventional communication terminal is performed, which enables improvement in user convenience.

First, an overview of the cooperative application 310 of the communication terminal 102 will be described. FIGS. 5A through 7C exemplify screens displayed on the operating unit 116 of the communication terminal 102. FIGS. 5A through 5D illustrate an example of screens that the cooperative application provides to the user. Upon an icon of the cooperative application being selected by a user operation at an application list screen (also referred to as drawer) or home screen of the communication terminal 102, the CPU 111 activates the cooperative application 310. The cooperative application 310 displays the top menu illustrated in FIG. 5A on the screen of the communication terminal 102 once activation processing is completed.

First, the functions of the cooperative application 310 will be described by way of the top menu screen. A currently-selected cooperating MFP is displayed in a region 501. In the present embodiment, an example of a case where the MFP 101 is specified as the cooperating partner is exemplified. The user selecting the region 501 enables the cooperating MFP 101 to be changed, or the state of the cooperating MFP 101 or MFP 101 capabilities to be confirmed. An add key 503 is a key that provides functions to register an MFP that will be a new cooperating partner. The user can register an MFP that will be a new cooperating partner using the add key 503. The cooperative application 310 stores information of the MFP, regarding which an instruction has been made by user operations to register as a cooperation partner, in the device list information 312. Thereafter, the registered MFP 101 can be selected as a cooperating MFP.

The cooperative application 310 can execute various types of cooperating functions by cooperating with the MFP 101 specified as a cooperating partner (e.g., MFP 101). For example, cooperation functions such as print cooperation, scan cooperation, and so forth, can be executed. A document key is a key that is used in a case of transmitting image data or document data stored in the communication terminal 102 to the cooperating MFP 101, and printing. The scan key is a key that is used in a case of executing scan cooperation functions of scanning an original at the cooperating MFP 101, and reading data obtained by scanning into the storage 114 of the communication terminal 102. A capture key is a key that is used in a case of imaging a document or markerboard or the like using the camera 118. A print release key is a key that is used in a case of providing a print instruction regarding print data stored in the MFP 101, from the operating unit of the communication terminal 102.

A key 502 is a key that is used in a case of executing the cooperation login function where a particular user is caused to be logged in. When the key 502 is selected, the cooperative application 310 transitions the screen displayed on the operating unit 116 to a panel login screen illustrated in FIG. 5B.

A panel login screen displays MFPs in the vicinity of the communication terminal 102. A region 511 displays a list of information indicating MFPs that are login candidates that the cooperative application 310 has determining to be in the vicinity of the communication terminal 102.

The panel login screen also displays information prompting the user to bring the communication device closer to the external device to which login is desired. Accordingly, in the present embodiment, the user that wants to use the cooperative login function can be visually notified that there are external devices nearby that are candidates for the cooperative login function. The information indicating the MFPs also includes reception level representing the received signal strength. Accordingly, in a case where the user comes close to an MFP for which login is desired, but a login candidate with a high reception level is not found, this can indicate to the user that this MFP cannot be logged into.

The cooperative application 310 determines whether an MFP that is a login candidate is present in the vicinity of the communication terminal 102, based on Bluetooth® Low Energy advertising packets that external devices (e.g., the MFP 101) in the vicinity transmit at predetermined intervals (e.g., 30 millisecond intervals). The advertising packets that the MFP 101 sends include information illustrated in Table 1, for example.

TABLE 1

| Item | Content |
| --- | --- |
| Local Name | Name of Device For example, MFP CXXX |
| Manufacturer Specific Data | Identifier of corporation and optional data |
| Service UUIDs | UUID for identifying service provided by device |

The cooperative application 310 references the Local Name and Manufacturer Specific Data included in the advertising packets of the received Bluetooth® waves. External devices that the cooperative application 310 supports are extracted from the external devices transmitting advertising packets, based on the information obtained by referencing, and displayed in the login screen. That is, the cooperative application 310 effects control so that even if advertising packets sent from an external device that cannot provide login functions are received, no display thereof is made in the region 511.

A sensitivity adjustment key 512 is a key used in a case of adjusting Bluetooth® sensitivity. For example, the user can select the sensitivity adjustment key 512 in a case where connection with an MFP is unstable or the like, and can adjust Bluetooth® sensitivity. This function enables a threshold value used for determining whether an MFP is being approached to be calibrated, taking into consideration individual differences of the Bluetooth® interface of the communication terminal 102, casing materials, effects of protective cases, radio wave environment in the area, and so forth. In a case where the sensitivity adjustment key is selected, the cooperative application 310 displays the sensitivity adjustment screen illustrated in FIG. 7A. The sensitivity adjustment screen displays information 701 indicating a method of how to perform sensitivity adjustment. Upon an OK key 702 being selected, Bluetooth® sensitivity adjustment is executed.

Returning to FIGS. 5A through 5D, a description is provided regarding a method of executing cooperation login. Upon determining that the communication terminal 102 is sufficiently near the MFP 101 sending advertising packets, the cooperative application 310 transmits a login request to the MFP 101. The MFP 101 receiving the login request decides whether to permit the login based on the login request. The MFP 101 notifies the login results to the communication terminal 102 via Bluetooth® Low Energy communication. In a case where login is successful, the cooperative application 310 displays the login-successful screen illustrated in FIG. 5C, and in a case where login failed, the authentication error screen illustrated in FIG. 5D is displayed.

A pop-up 521 is information indicating that login is successful. A pop-up 531 is a notification that the login failed, and is information suggesting the user to reconfirm the settings and state of the communication terminal 102 or MFP 101.

Figure 13A:
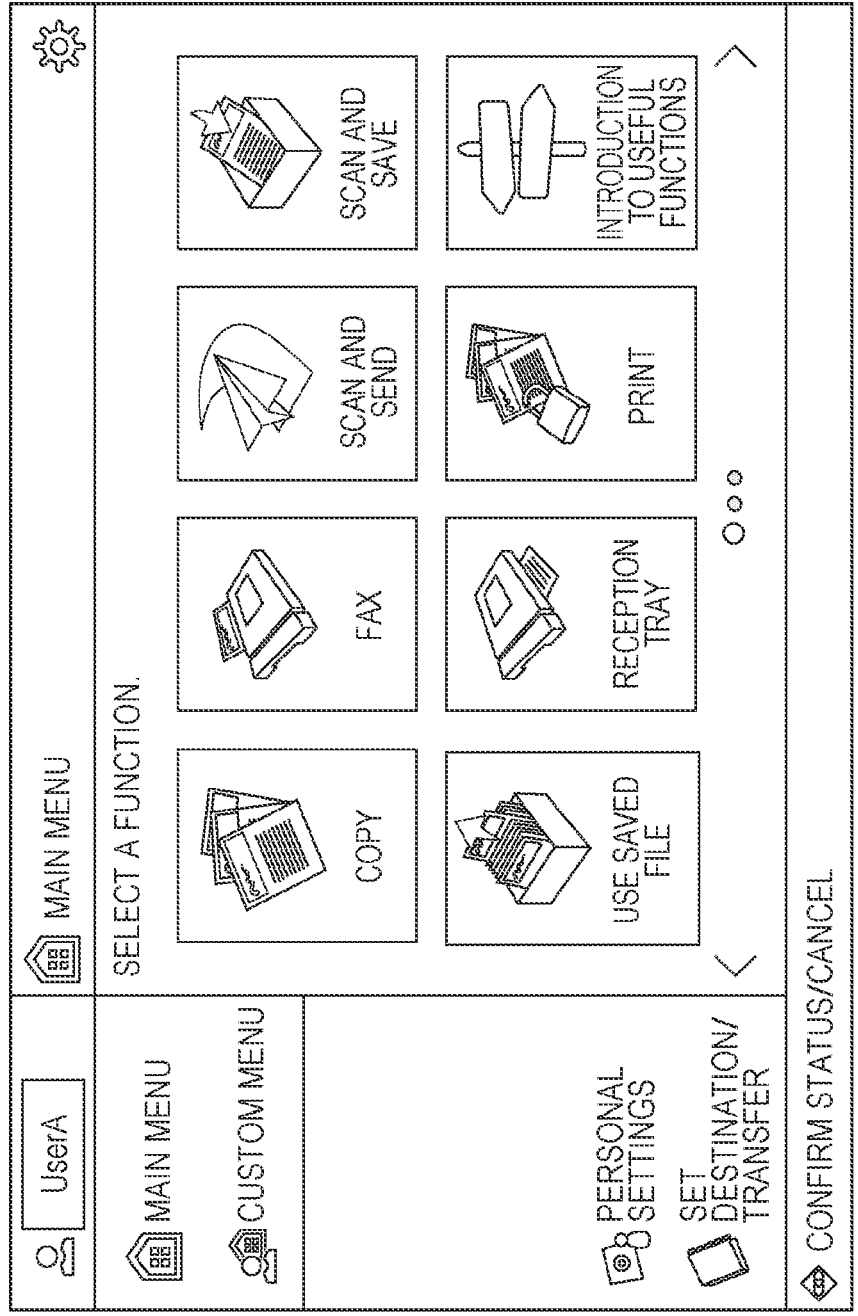
FIGS. 13A and 13B are diagrams for describing an example of screens displayed on an operating unit of the MFP.
Figure 13B:
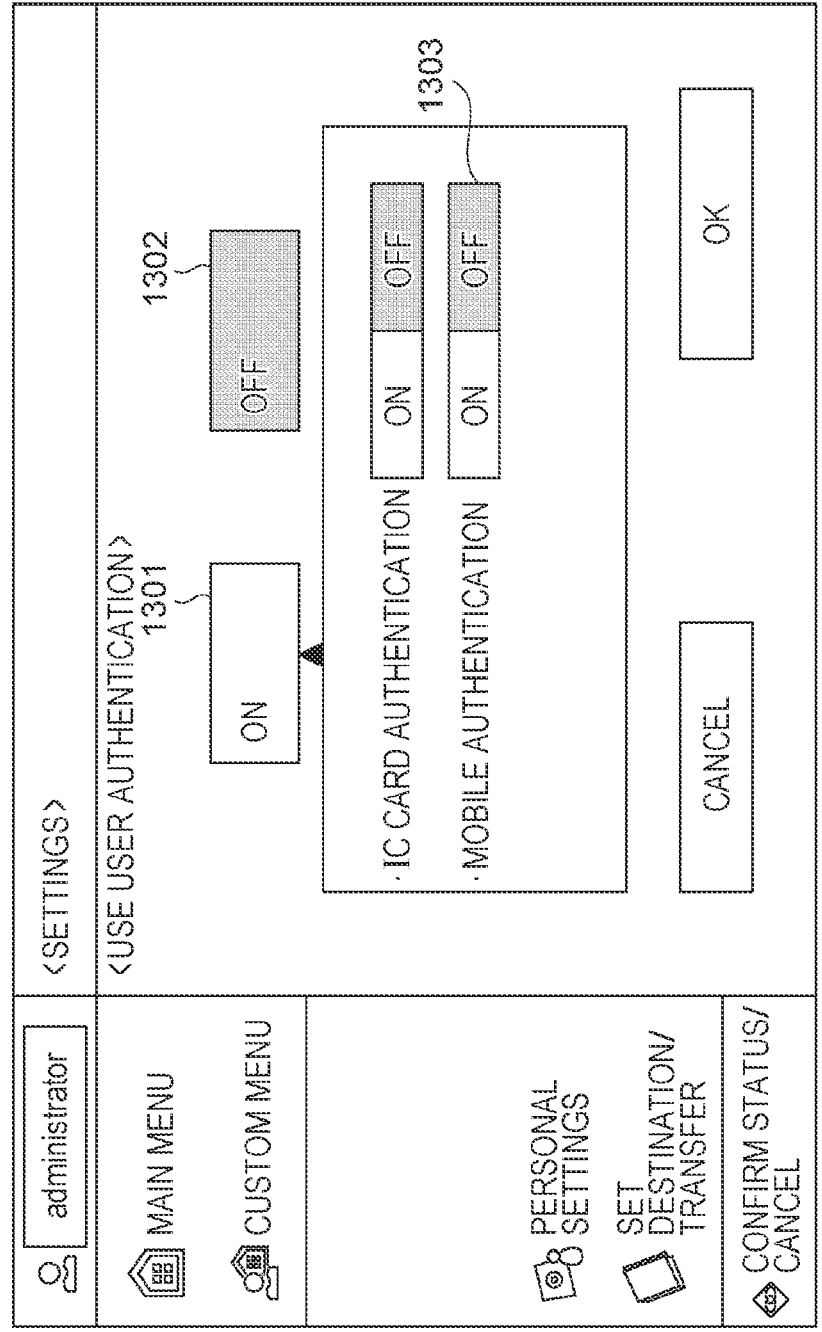

Thus, the user can log into the MFP 101 simply by bringing the communication terminal 102 near to the MFP 101. After user login, a main screen is displayed on the operating unit 136 of the MFP 101. FIGS. 13A and 13B are examples of a screen displayed on the operating unit 136 of the MFP 101, with FIG. 13A illustrating an example of the main screen. The user who has executed the cooperative login function described with reference to FIGS. 5A through 5D can thus use the MFP's 101 functions via the MFP's 101 operating unit 136. This enables users to login to an MFP simply by holding the user's communication terminal up to the MFP. Accordingly, the trouble of operations such as inputting user ID and password in a case of logging into an MFP can be reduced.

Additional detailed control is also performed in the present embodiment, not just the basic login control described with reference to FIGS. 5A through 5D. A specific control method will be described below with reference to the flowcharts in FIGS. 8 through 11.

Figure 8:
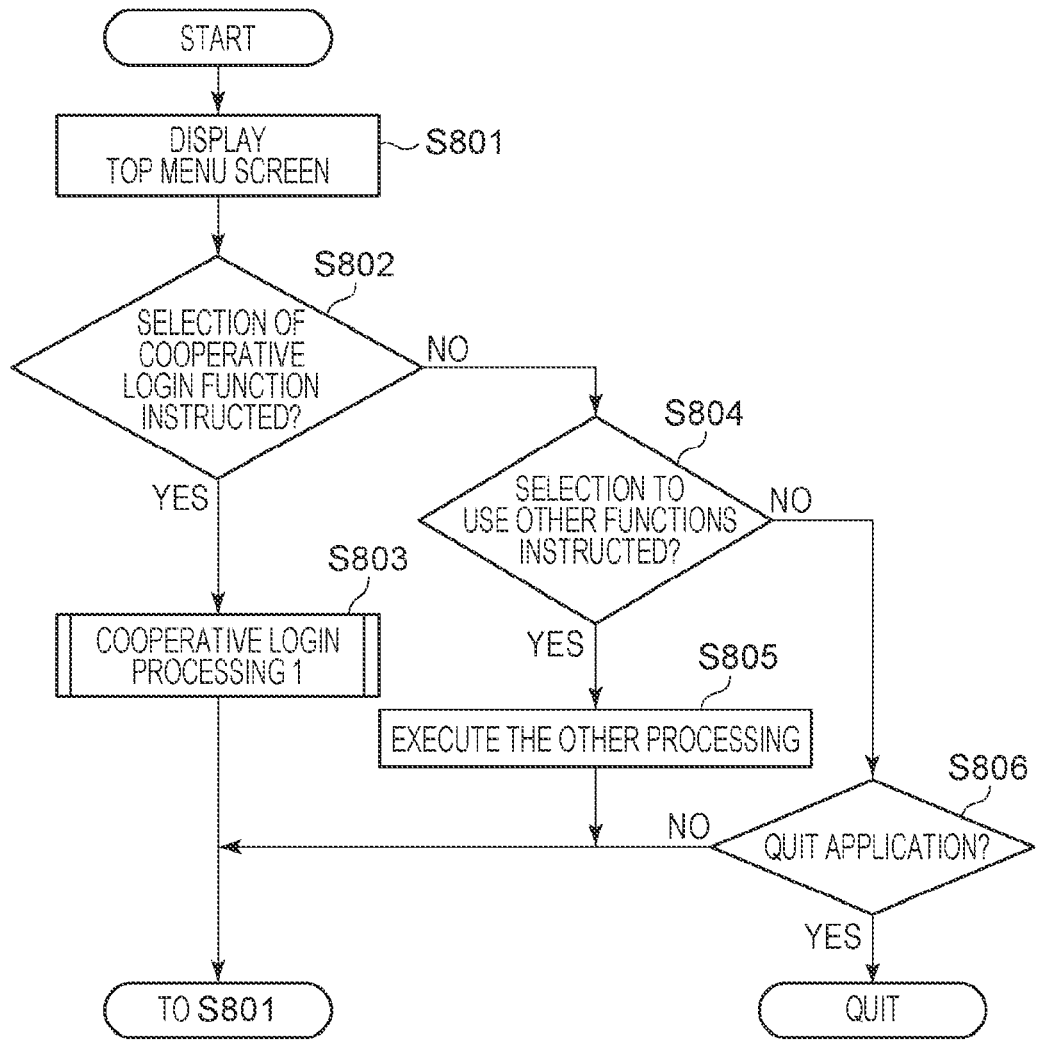
FIG. 8 is a flowchart illustrating control of the communication terminal.
Figure 9:
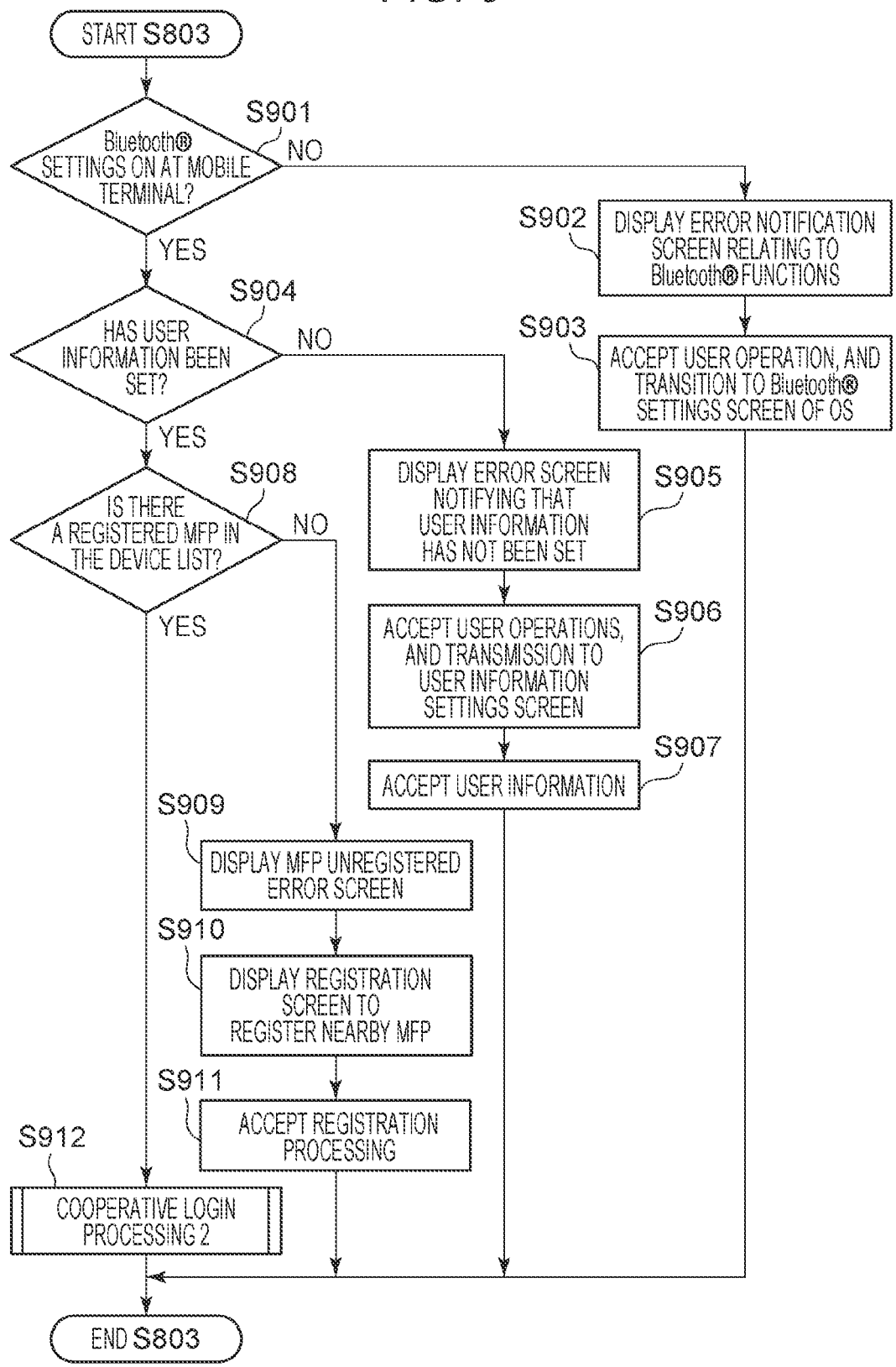
FIG. 9 is a flowchart illustrating control of the communication terminal.
Figure 10:
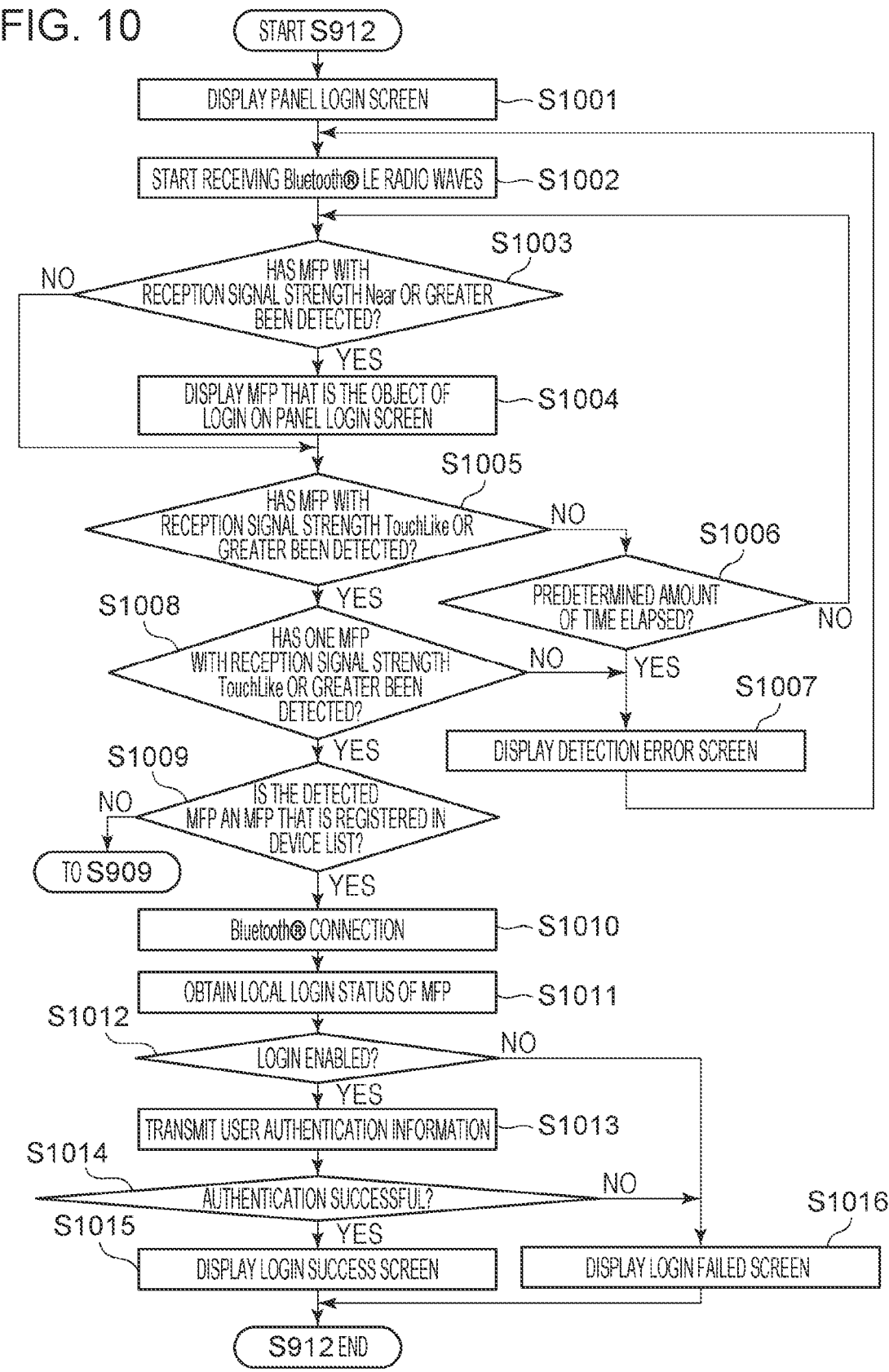
FIG. 10 is a flowchart illustrating control of the communication terminal.

FIGS. 8 through 10 are flowcharts illustrating control of the communication terminal 102. The operations (steps) illustrated in the flowcharts in the FIGS. 8 through 10 are realized by the CPU 111 reading out programs for realizing control modules, stored in the ROM 112 or storage 114, loading the programs to the RAM 113, and executing the programs. The processing illustrated in the flowcharts is realized by the cooperative application 310 being the main acting entity acting in collaboration with the OS 300 that is a control program. In a case where a control program that is the main acting entity causing the operations to occur, the operations will be described with the OS 300 or cooperative application 310 as the main acting entity.

Figure 11:
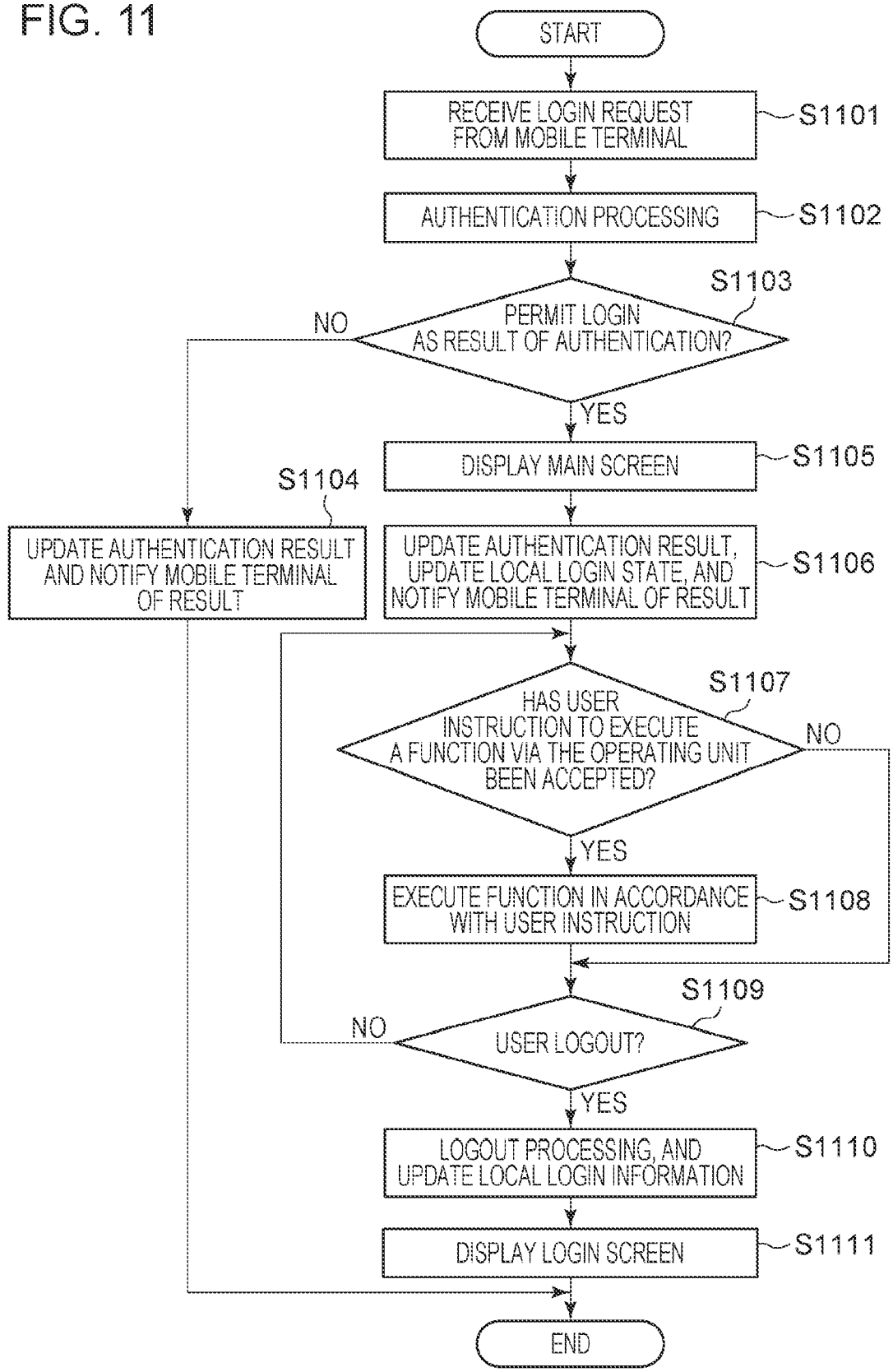
FIG. 11 is a flowchart illustrating control of the MFP.

FIG. 11 is a flowchart illustrating control of the MFP 101. The operations illustrated in the flowchart in FIG. 11 are realized by the CPU 131 reading out programs for realizing control modules, stored in the ROM 132 or storage 134, loading the programs to the RAM 113, and executing the programs.

FIG. 8 is a flowchart illustrating operations of the communication terminal 102 in a case where an icon of the cooperative application has been selected via the drawer or home screen of the communication terminal 102. In S801, the CPU 111 displays the top menu screen on the operating unit 116. In S802, the CPU 111 determines whether a user instruction has been accepted using cooperative login function. In a case where a user instruction using the cooperative login function has been accepted, the flow advances to S803. In a case where a user instruction using the cooperative login function has not been accepted, the flow advances to S804. A user operation using the cooperative login function is, for example, an operation of selecting the key 502 displayed on the top menu screen in FIG. 5A. Details of the cooperative login processing in S803 will be described below. Upon completion of the cooperative login processing, the CPU 111 transitions the screen displayed on the operating unit 116 to the top menu screen, and returns to the processing of S801.

In S804, the CPU 111 judges whether a user instruction using another function has been accepted. In a case where a user instruction using another function has been accepted, the flow advances to S805. In a case where a user instruction using another function has not been accepted, the flow is advanced to S806. In S805, the CPU 111 executes the other function based on the user instruction. For example, the CPU 111 can execute print cooperation functions where image data or document data stored in the communication terminal 102 is transmitted to the cooperating MFP 101, and printing is performed. Scan cooperation functions can be executed where the MFP 101 and communication terminal 102 cooperate to scan a paper original and transmit or save the scan. The CPU 111 can also execute the print release functions where a print instruction is provided regarding print data stored at the MFP 101 from the operating unit of the communication terminal 102, for example. Upon execution of functions based on a user instruction being completed, the CPU 111 transitions the screen displayed on the operating unit 116 to the top menu screen and the flow returns to S801.

Next, in S806, the CPU 111 judges whether an instruction has been received to quit the application. In a case of having received an instruction to quit the application, execution of the cooperative application 310 is stopped, the screen displayed on the operating unit 116 is transitioned to the home screen that the home application of the OS provides, and the series of control ends. In a case of having not accepted an instruction to quit the application, the flow returns to S801. Thus, the user can execute various cooperative functions including the cooperative login function, in a state where the cooperative application 310 is activated.

Next, specific control of the cooperative login function will be described with reference to FIG. 9. Exception processing in a case where the cooperative login function cannot be executed due to settings or the status at the communication terminal 102 side will be described in the flowchart in FIG. 9.

In S901, the CPU 111 judges whether the wireless communication function using the Bluetooth® interface 123 has been set to valid, as operation settings of the communication terminal 102. The cooperative application 310 queries the OS 300 whether the wireless communication function is valid. In a case of having judged to be valid based on the result of the query, the flow advances to S904. In a case of having judged to be not valid (i.e., invalid) based on the result of the query, the flow advances to S902.

Figure 6A:
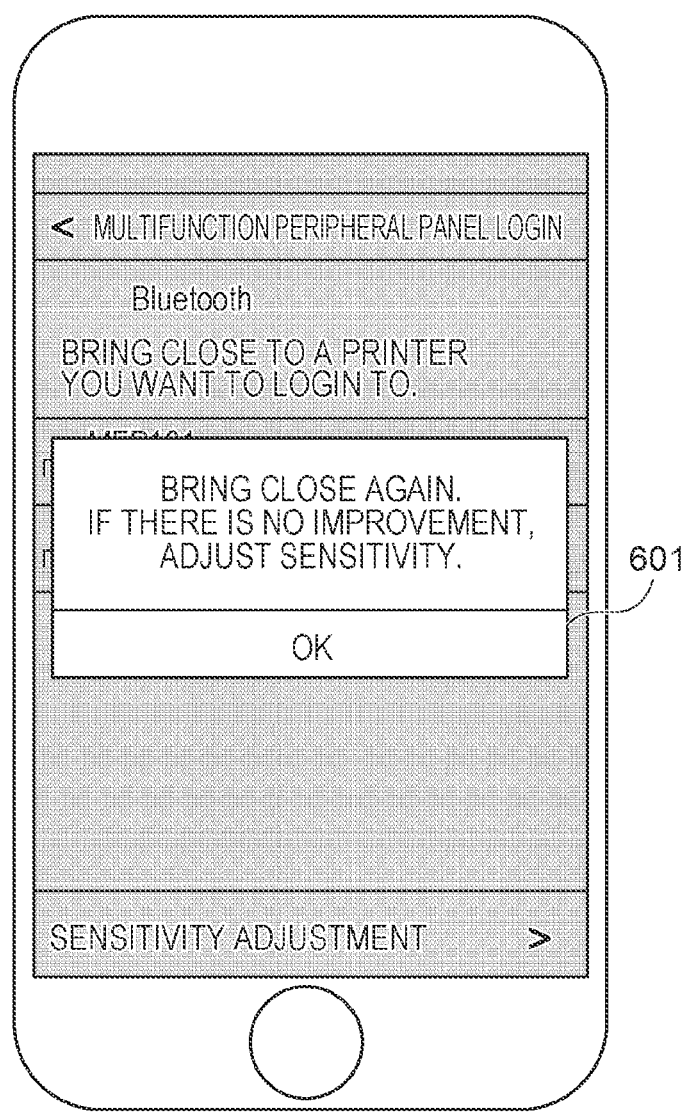
FIGS. 6A through 6D are diagrams for describing an example of screens displayed on the operating unit of the communication terminal.
Figure 6B:
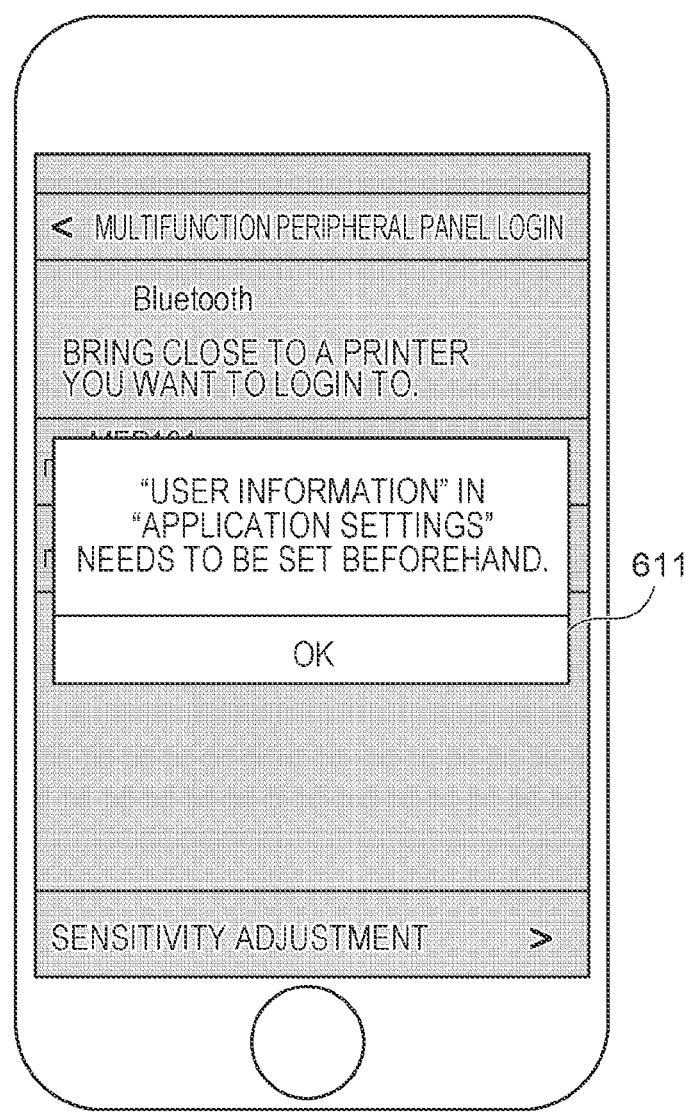
Figure 6C:
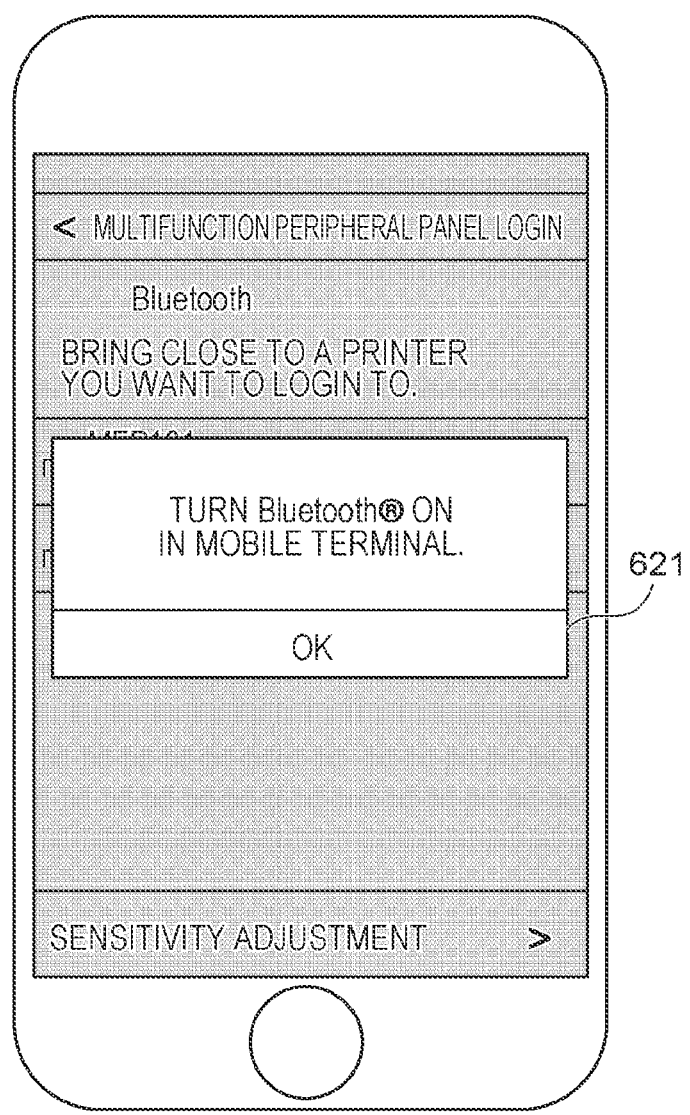

In S902, the CPU 111 displays an error notification screen relating to Bluetooth® functions. FIG. 6C illustrates an example of an error notification screen displayed in S902. A pop-up 621 notifying the user that the Bluetooth® of the communication terminal 102 should be turned ON is displayed in the error notification screen.

In S903, the CPU 111 switches the screen displayed on the operating unit 116 to a Bluetooth® settings screen that the OS provides. Specifically, upon having accepted selection of the OK key by the user, the cooperative application 310 commissions the OS 300 to transition the screen displayed on the operating unit 116 to the Bluetooth® settings screen. The OS 300 switches the screen displayed on the operating unit 116 to the Bluetooth® settings screen, while running the cooperative application 310 in the background. The user can change settings of whether wireless communication functions using the Bluetooth® interface 123 are valid (on) or invalid (off), via the Bluetooth® settings screen. While transitioning to the OS settings screen after having displayed the pop-up in S902 has been provided in the present embodiment as an example, this is not restrictive. Transitioning to the OS settings screen in S903 can be performed without displaying the pop-up in S902.

Upon acceptance of an operation to return to the original screen from the settings screen (e.g., a user operation of closing the settings screen), the OS 300 switches the screen displayed on the operating unit 116 to the screen of the cooperative application 310. The cooperative application 310 transitions the screen displayed on the operating unit 116 to the top menu screen, and the processing of S803 ends. Due to the processing of S902 through S903, the user can change wireless communication functions to enabled, using the Bluetooth® interface 123, simply by performing operations along with the series of screen transitions provided by the cooperative application 310.

Next, in S904, the CPU 111 judges whether user authentication information has been set. In a case where user authentication information has been set in the user authentication information 311 of the cooperative application 310, the flow advances to S908. In a case where user authentication information is not set in the user authentication information 311 of the cooperative application 310, the flow advances to S905.

In S905, the CPU 111 displays an error screen notifying that user information has not been set. FIG. 6B illustrates an example of an error screen displayed in S905. A pop-up 611 notifying the user that user information needs to be set is displayed in this error screen.

In S906, upon accepting user selection of the OK key, the CPU 111 switches the screen displayed on the operating unit 116 to a user information settings screen. FIG. 7B illustrates an example of a user information settings screen provided by the cooperative application 310 that is displayed in S906.

The user can input the user authentication information in a region 711 to set the user authentication information. In S907, the CPU 111 accepts the input of user authentication information. Upon the OK key being selected, the CPU 111 updates the user authentication information 311 based on the user authentication information input to the region 711. When updating is completed, the CPU 111 transitions the screen displayed on the operating unit 116 to the top menu screen, and ends the processing of S803. Based on the processing in S905 through S907, the user can perform user authentication settings, necessary for cooperative login functions, following the series of screen transitions.

In S908, the CPU 111 judges whether there is an external device registered as a cooperation partner. In a case where there are one or more sets of management information in the device list information 312 of the cooperative application 310, the flow advances to S912. In a case where one or more sets of management information are not in the device list information 312 of the cooperative application 310, the flow advances to S909.

Figure 6D:
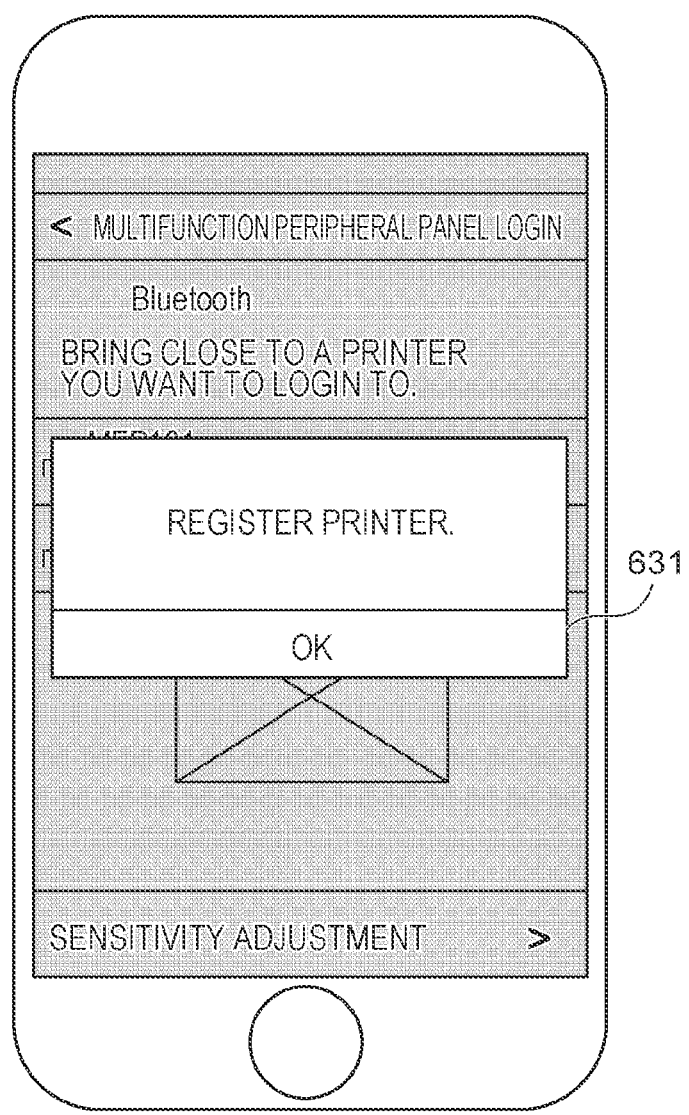

In S909, the CPU 111 displays an error screen notifying that there is no MFP registered as a cooperating partner. FIG. 6D illustrates an example of an error screen displayed in S909. This error screen includes a pop-up 631 notifying that there is the need to register an MFP as a cooperating partner.

In S910, upon accepting user selection of the OK key, the CPU 111 switches the screen displayed on the operating unit 116 to a registration screen for registering a nearby MFP 101 as a cooperating partner. FIG. 7C illustrates an example of a registration screen for registering a nearby MFP 101 displayed in S910, which the cooperative application 310 provides.

The registration screen displays items indicating MFPs in the vicinity of the communication terminal 102. Illustrated here is an example of a case where the MFP 101, and an MFP 104 that is an external device separate from the MFP 101, have been found by searching advertising packets. The user can select item 721 or 722 to register the MFP 101 corresponding to this item as the cooperating external device.

Returning to description of FIG. 9, in S911 the CPU 111 accepts registration processing of the external device based on user operations via the registration screen. The CPU 111 stores information of the MFP 101 instructed to the registered as a cooperating partner in the device list information 312 that the cooperative application 310 manages. The registered MFP 101 is thereafter selectable as a cooperating MFP 101. Also, in the series of registration processing, pairing processing is performed between Bluetooth® Low Energy device, and long term key (LTK), which is an encryption key for maintaining communication between the device secure, is exchanged. This processing enables suppressing trouble of inputting personal identification number (PIN) code, necessary for pairing in subsequent Bluetooth® Low Energy communication, and so forth. When registration processing is completed, the CPU 111 transitions the screen displayed on the operating unit 116 to the top menu screen, and ends the processing of S803.

Based on the processing of S909 through S912, in a case where there is no cooperating MFP 101 registered beforehand, processing can be performed to register an MFP to be used as a cooperating partner, before using the cooperative login function. Pairing is performed between devices beforehand, in the series of registration processing, so situations where PIN code input operations occur can be suppressed when performing cooperative login processing using Bluetooth® Low Energy communication thereafter. Based on the processing in each of the steps described above, in cases where judgement can be made beforehand that settings used for login processing have not been appropriately made, the user is notified at a stage before searching for external devices in the vicinity, thereby suppressing unnecessary user operations.

Next, in S912, control relating to logging processing from an actual nearby external device search is executed. The processing of S912 will be described with reference to the flowchart in FIG. 10.

Figure 5A:
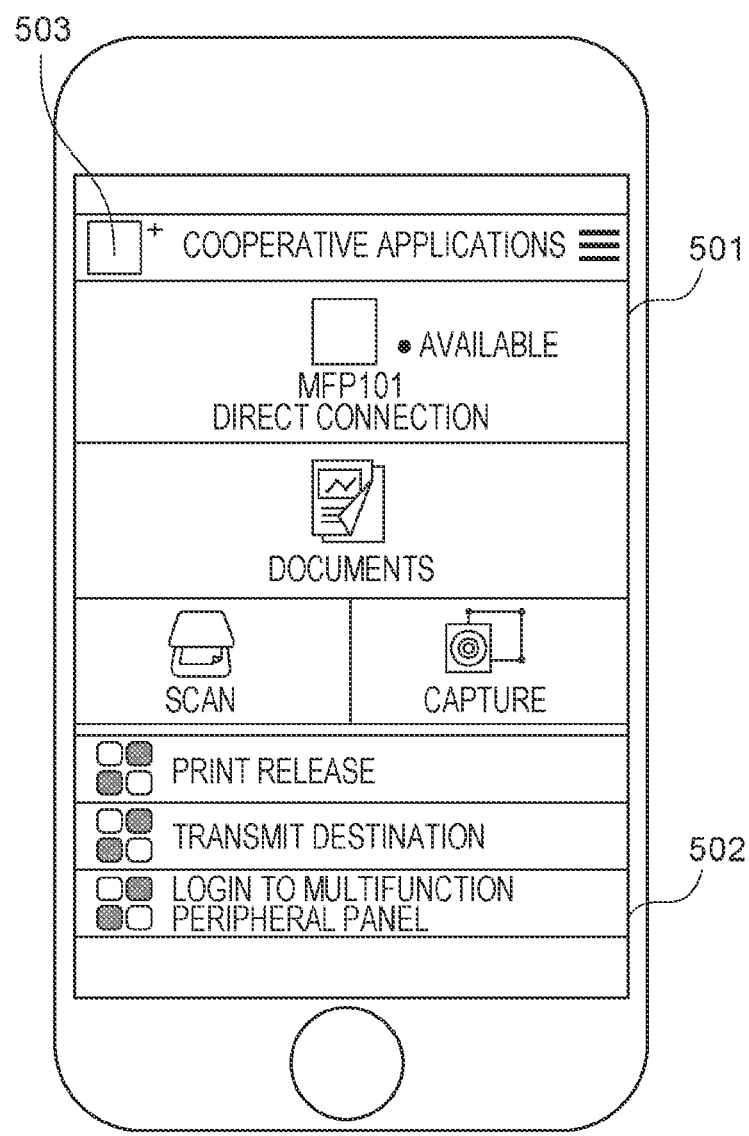
FIGS. 5A through 5D are diagrams for describing an example of screens displayed on an operating unit of the communication terminal.
Figure 5B:
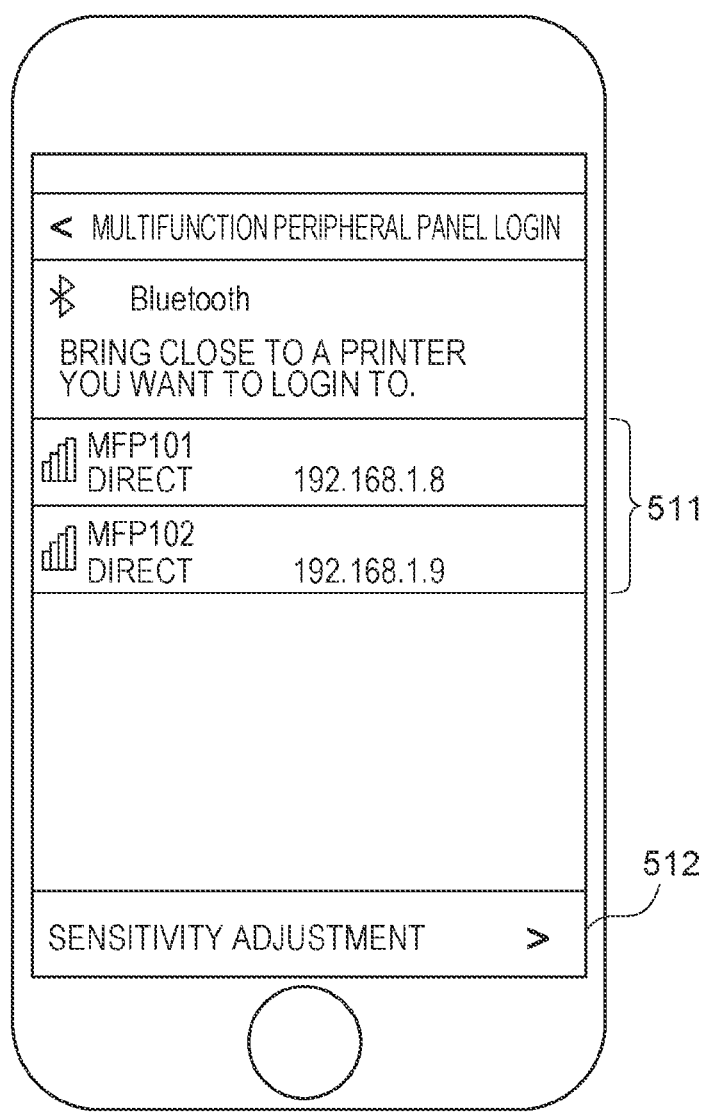

In S1001, the CPU 111 displays the panel login screen described in FIG. 5B. In S1002, the CPU 111 starts receiving radio waves for Bluetooth® Low Energy communication. Specifically, in order to receive radio waves for Bluetooth® Low Energy communication, the cooperative application 310 commissions the OS 300 to start reception of radio waves for Bluetooth® Low Energy communication. The OS 300 controls the Bluetooth® interface 123 via the Bluetooth® control unit 301 and starts reception of Bluetooth® advertising packets. The OS 300 notifies the cooperative application 310 of received Bluetooth® advertising packets and the received signal strength of the advertising packets. The cooperative application 310 temporarily stores the received advertising packets, and the received strength of the packets.

In S1003, the CPU 111 determines whether an MFP with received signal strength of Near or greater has been detected. In the present embodiment, a reception signal strength where it can be assumed that the distance between the MFP 101 and communication terminal 102 is approximately 3 m or so, for example is Near. In a case where a packet has been found to have been transmitted from a supported MFP 101, and the received signal strength of the packet is Near or greater, based on the analysis results of advertising packets, the cooperative application 310 advances the processing to S1004. In a case of a packet transmitted from an unsupported external device, or a case where the signal strength of received advertising packets is smaller than Near, the processing of S1004 is skipped, and the flow advances to S1005.

In S1004, the CPU 111 displays information indicating the MFP 101 that is the object of login, on the panel login screen displayed in S1001. In a case where advertising packets having received signal strength of Near or greater have been received from multiple MFPs, information indicating the multiple MFPs is displayed. The order of priority in which the information is displayed can be rearranged as appropriate based on the order of received signal strength or the like.

In S1005, the CPU 111 determines whether an MFP with received signal strength of TouchLike or greater has been detected. In the present embodiment, a reception signal strength where it can be assumed that the distance between the MFP 101 and communication terminal 102 is approximately 3 cm or so, for example is TouchLike. In a case where a packet has been found to have been transmitted from a supported MFP 101, and the received signal strength of the packet is TouchLike or greater, based on the analysis results of advertising packets, the cooperative application 310 advances the processing to S1008. In a case of a packet transmitted from an unsupported external device, or a case where the signal strength of received advertising packets is smaller than TouchLike, the flow advances to S1006.

Figure 7A:
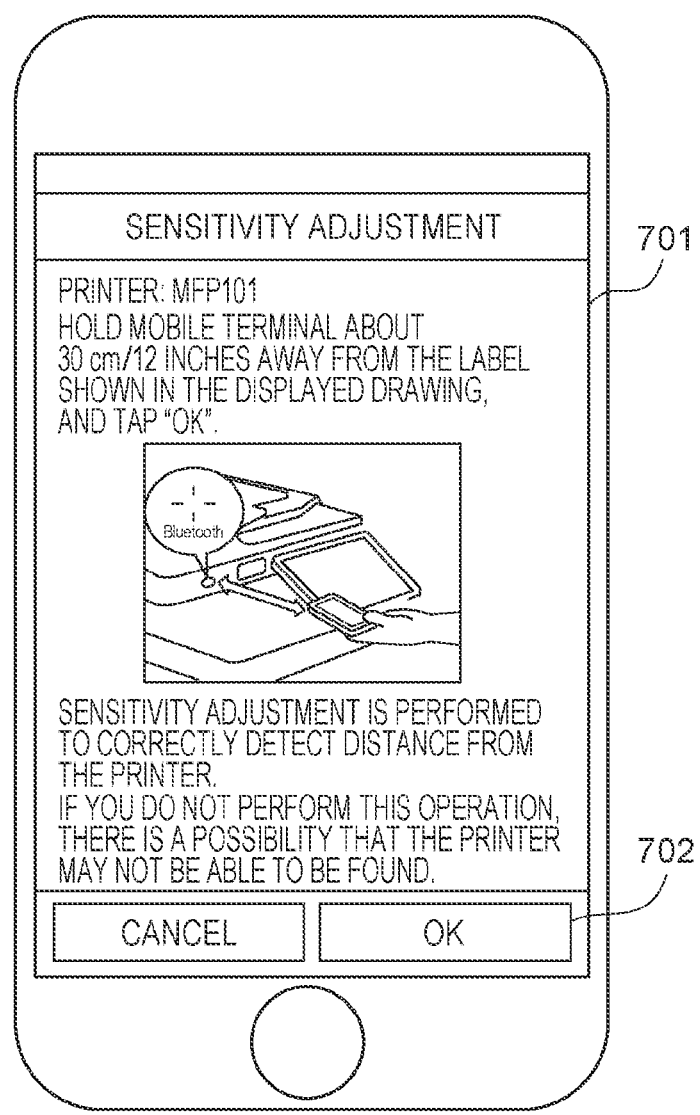
FIGS. 7A through 7C are diagrams for describing an example of screens displayed on the operating unit of the communication terminal.
Figure 7B:
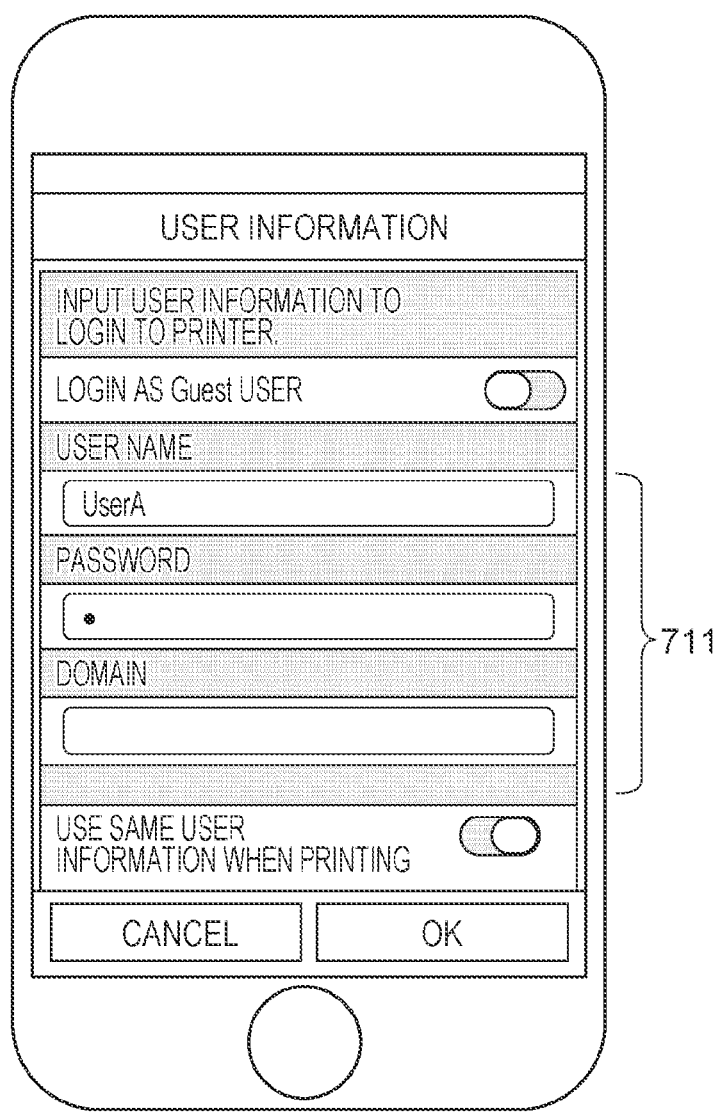
Figure 7C:
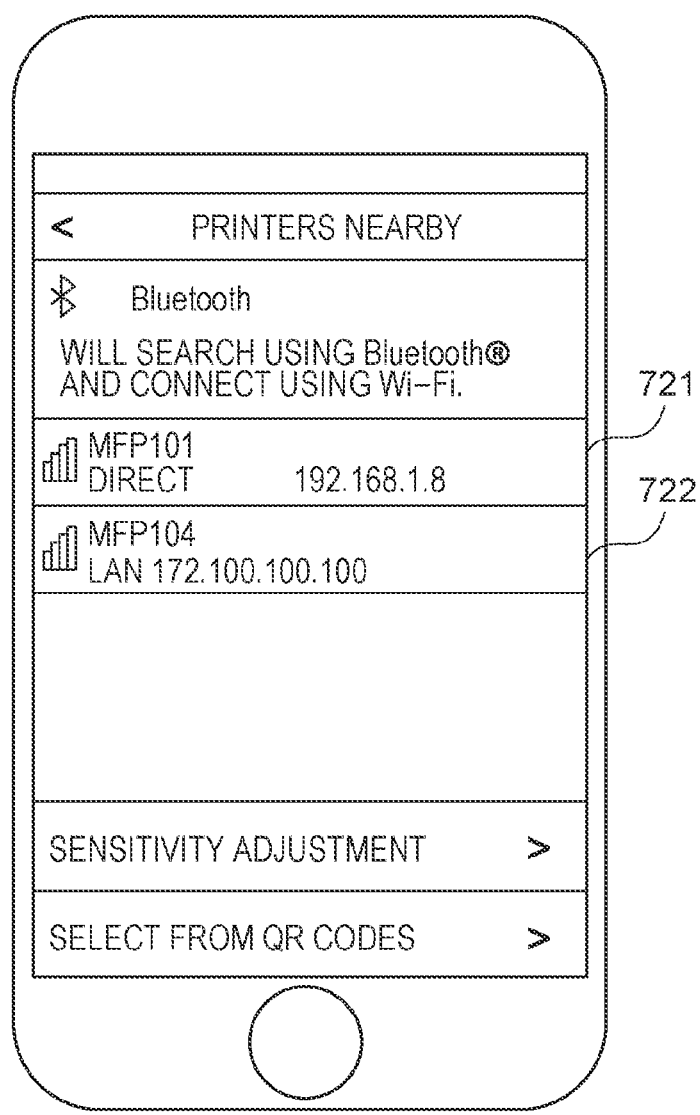

The TouchLike and Near threshold values have been calibrated for the communication terminal 102 beforehand, by the sensitivity adjustment function described in FIG. 7A. In a case where sensitivity adjustment has not been performed even one time, the initial values set at the time of installing the application are used.

In S1006, The CPU 111 determines whether a predetermined amount of time has elapsed since starting Bluetooth® Low Energy radio wave reception. In a case where a predetermined amount of time has elapsed from the start of Bluetooth® Low Energy radio wave reception, the flow advances to S1007, and a in case where a predetermined amount of time has not elapsed from the start of Bluetooth® Low Energy radio wave reception, the flow returns to S1003 and continues MFP 101 searching processing.

In S1007, the CPU 111 displays a detection error screen indicating that close proximity between an MFP and communication terminal 102 was not detected. FIG. 6A illustrates an example of the detection error screen displayed in S1007. A pop-up 601 notifying that the communication terminal 102 needs to be brought closer, and if there is no improvement, sensitivity adjustment should be performed in the detection error screen, is displayed. Upon detecting that the OK button has been selected, the CPU 111 returns the flow to S1002, and searching for nearby MFPs is resumed. Note that an arrangement can be made where, in a case where no MFP 101 of which the received signal strength is Near or greater has been found, a pop-up indicating that no MFP 101 has been found nearby can be displayed.

Next, in S1008, the CPU 111 determines whether the number of MFPs of which the received signal strength detected in S1005 is TouchLike or greater is one. In a case where the number of MFPs of which the received signal strength is TouchLike or greater, detected in S1005, is one, the flow advances to S1009, and in a case where the number of MFPs of which the received signal strength is TouchLike or greater, detected in S1005, is not one, the flow advances to S1007. The processing in S1008 is exemption processing to suppress transmission of login requests to multiple MFPs.

In S1009, the CPU 111 determines whether the MFP 101 detected in S1005 is an MFP stored in the device list information 312. In a case where the detected MFP is an MFP stored in the device list information 312, the flow advances to S1010, and in a case where the detected MFP is not an MFP stored in the device list information 312, the flow advances to the MFP registration sequence of S909 and thereafter.

In S1010, the CPU 111 establishes a Bluetooth® Low Energy connection with the MFP 101 detected in S1005. To facilitate explanation, description will be provided of the following steps regarding an example of a case where advertising packets of the MFP 101 have been detected by the communication terminal 102 at a received strength of TouchLike or greater.

Upon a Bluetooth® Low Energy connection being established with the MFP 101, the MFP 101 and communication terminal 102 are in a state where Generic Attributes (GATT) communication can be performed. Specifically, the cooperative application 310 commissions the OS 300 to start Bluetooth® Low Energy communication with the MFP 101, in order to start Bluetooth® Low Energy communication. The OS 300 controls the Bluetooth® interface 123 via the Bluetooth® control unit 301 to start Bluetooth® Low Energy communication with the MFP 101.

Figure 12:
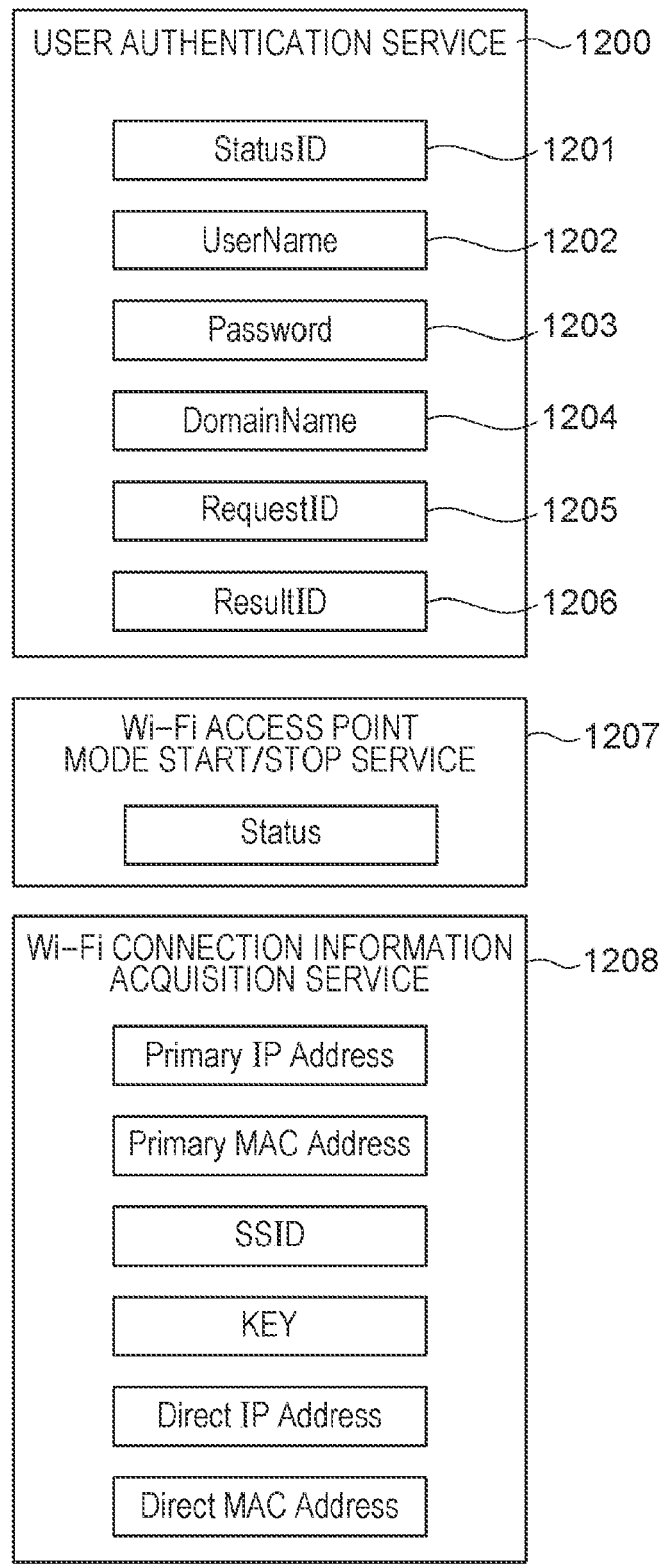
FIG. 12 is a diagram for describing data communication using Bluetooth® LE.

Next, GATT communication will be described. The MFP 101 according to the present embodiment includes a GATT server that discloses various types of services defined in a GATT profile, for exchanging data by Bluetooth® Low Energy with external devices. FIG. 12 is a diagram for describing GATT communication, illustrating an example of a GATT server that the MFP 101 discloses. The GATT server discloses user authentication service 1200, Wi-Fi® AP mode start/stop service 1207, and Wi-Fi® connection information acquisition service 1208.

The user authentication service 1200 includes the following characteristics defined in the GATT profile. The profile and characteristics in GATT are in a relation like class and member variables in an object-oriented programming language. When there is change in the login status of the user of the MFP 101, the CPU 131 of the MFP 101 reads and writes the values of the characteristics.

StatusID 1201 is a characteristic indicating the status of the MFP 101 regard to whether login is enabled. The communication terminal 102 sets the StatusID 1201 to Read, and obtains the status of the MFP 101 regarding whether login is enabled. The MFP 101 stores a value shown in Table 2 (list of statuses of whether login is enabled) as the value of the StatusID 1201.

TABLE 2

| StatusID | Meaning |
| --- | --- |
| 1 | Login enabled |
| 2 | Login not enabled, due to another user being logged in |
| 3 | Login not enabled, due to login screen not being displayed |
| 4 | Login not enabled, due to cooperative login functions being forbidden |

When there is change in the user login status or screen transition state of the MFP 101, this value is changed by the CPU 131. When there is a change in the value of the StatusID 1201, change of the value is notified to the communication terminal 102 that is in Bluetooth® Low Energy connection, by Notification in the Attribute Protocol (ATT). A StatusID of "4" will be described with reference to FIG. 13B. FIG. 13B exemplifies an administrator settings screen of the MFP 101. The MFP 101 according to the present embodiment can switch ON/OFF of user authentication functions and ON/OFF of cooperative login functions, as operation settings of the MFP 101. The administrator of the MFP 101 can change the operation settings of the MFP 101 via the screen in FIG. 13B. The MFP 101 switches operations of user authentication functions based on the settings.

In a case where user authentication is set to OFF, the MFP 101 is in a state where the functions of the MFP 101 can be used via the operating unit 136 without the user being requested to login. Accordingly, the MFP 101 stores "4" in the StatusID. Even if the user authentication is set to ON, local login cooperating with the communication terminal 102 must be forbidden if the cooperative login functions are set to OFF. Accordingly, the MFP 101 stores "4" in the StatusID.

Returning to FIG. 12, the other characteristics of the user authentication service 1200 will be described. UserName 1202, Password 1203, and DomainName 1204 are each characteristic for writing user identification information at the time of the communication terminal 102 making a login request.

RequestID 1205 is a characteristic for the communication terminal 102 to write a request to the user authentication service. Characteristics 1202 through 1205 are configured so that external devices that have established Bluetooth® Low Energy communication can write values. Characteristics 1202 through 1205 can also be configured as characteristics that need encryption to access.

The communication terminal 102 writes 1 indicating a login request or 2 indicating a logout request, or the like, to RequestID 1205. Upon accepting an instruction to write 1 to RequestID 1205 from the communication terminal 102, the CPU 131 of the MFP 101 performs user authentication based on the user identification information (i.e., authentication information received by Bluetooth® Low Energy communication) written to characteristics 1202 through 1204.

ResultID 1206 is a characteristic that stores authentication results (whether login results are success or fail), when the MFP 101 receives a login request from the communication terminal 102 and performs user authentication. For example, the MFP 101 writes a value indicating login successful or login failed or the like, to the ResultID 1206, as authentication results. When authentication results are stored in the ResultID 1206 at the MFP 101, the change of value of the authentication results is notified to the communication terminal 102 in Bluetooth® Low Energy communication, by Notification in ATT.

Wi-Fi® AP mode start/stop service 1207 is a service used when switching to the access point operation mode of the MFP 101 from the communication terminal 102. Wi-Fi® connection information acquisition service 1208 is a service used in a case of obtaining connection information to an MFP from a communication terminal. These services are appropriately used when performing handover from Bluetooth® Low Energy communication to wireless communication conforming to IEEE 802.11. Thus, the communication terminal 102 performs interactive Bluetooth® Low Energy communication with the MFP 101 by reading and writing characteristics of the GATT server that the MFP 101 discloses.

Returning to the description in FIG. 10, in S1011 the CPU 111 obtains the local login status of the MFP 101. Specifically, the cooperative application 310 and OS 300 collaborate to access the user authentication service 1200 that the MFP 101 discloses, and obtains the value of the characteristic indicating the local login status (StatusID 1201 in FIG. 12).

Next, in S1012, the CPU 111 determines whether the intended MFP 101 is in a state where login is enabled, based on the local login status obtained in S1009. Specifically, a case where the StatusID 1201 is "1", the CPU 111 determines that login is enabled, and the flow advances to S1013. In a case where the StatusID 1201 is other than "1", the CPU 111 judges that login is not enabled (login disabled), and the flow advances to S1016.

In S1013, the CPU 111 transmits a login request to the MFP 101 using Bluetooth® Low Energy communication. Specifically, the cooperative application 310 and OS 300 collaborate to write to the UserName 1202, Password 1203, and DomainName 1204 of the MFP 101, based on user credentials stored in the user authentication information 311. The cooperative application 310 and OS 300 collaborate to write a value indicating a login request to the RequestID 1205.

In S1014, the CPU 111 determines whether login has been successful. In a case where authentication is performed at the MFP 101 side based on the login request, and a value is written to ResultID 1206 that is the result thereof, the change in value is notified to the communication terminal 102 by Notification in ATT. In response to this notification, the CPU 111 obtains the ResultID 1206 from the MFP 101 via Bluetooth® Low Energy communication, and determines whether login has been successful. In a case where a value indicating login successful has been obtained as the ResultID, the flow advances to S1015. In a case where a value indicating login failed has been obtained as the ResultID, the flow advances to S1016.

Figure 5C:
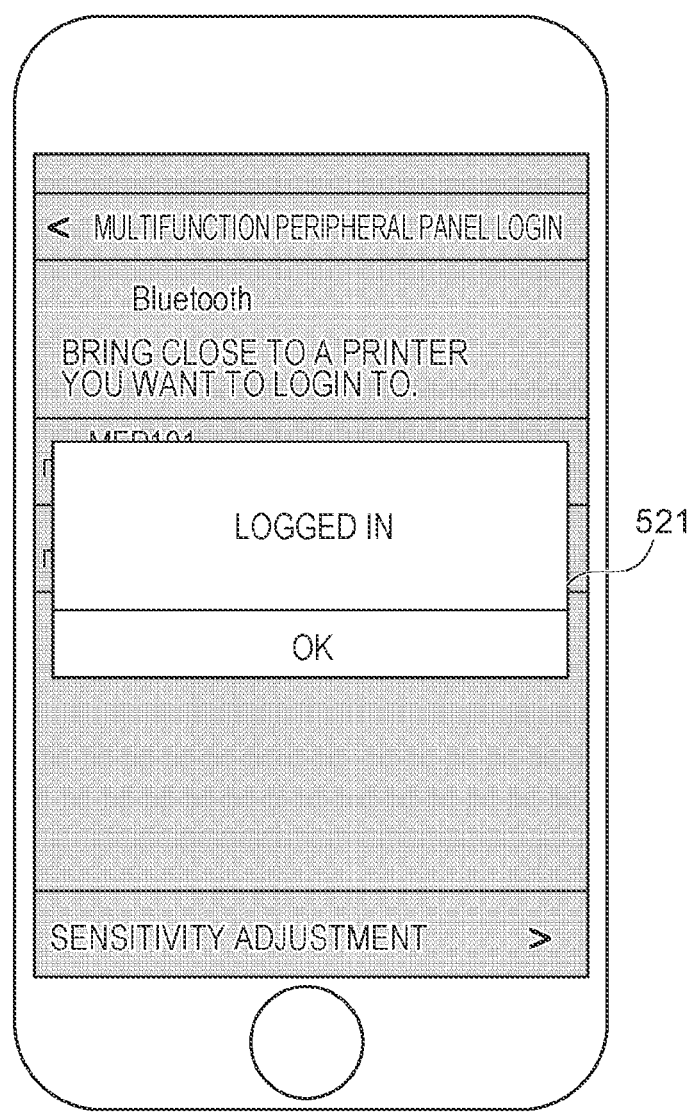
Figure 5D:
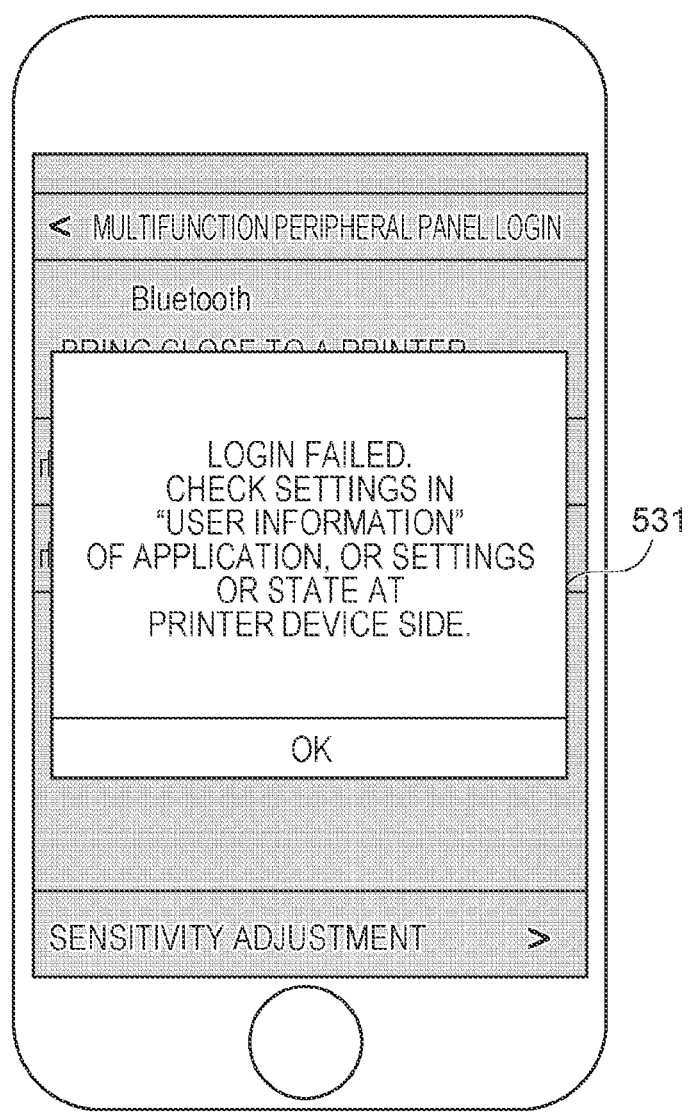

In S1015, the CPU 111 displays the login successful screen exemplified in FIG. 5C. In S1016, the CPU 111 displays the authentication error screen exemplified in FIG. 5D. The content of the pop-up 531 displayed on the authentication error screen differs depending on the type of login error. FIG. 5D exemplifies an error screen in a case where determination has been made in S1014 that authentication has failed, as one example. The pop-up in FIG. 5D can suggest to the user that there is a possibility that user authentication information settings in the cooperative application 310 are incorrect.

Next, a case of another login error will be described. For example, the CPU 111 notifies the user why the error occurred, based on the value of StatusID obtained in S1011. For example, in a case where the value of StatusID is "2", a notification such as "Could not login because another user is already logged in." or the like is made. In a case where the value of StatusID is "3", a notification such as "Could not login because another screen is displayed. Switch to the login screen and try again." or the like is made. In a case where the value of StatusID is "4", a notification such as "Could not login because multifunction peripheral panel login functions are not permitted. Please contact the MFP administrator for details." or the like is made.

Processing at MFP Side

Next, control of the MFP 101 that receives the login request from the communication terminal 102 will be described with reference to FIG. 12. To facilitate explanation, FIG. 12 exemplifies control in a case where the MFP 101 accepts a login request from a mobile terminal.

In S1101, the CPU 131 receives a login request from the communication terminal 102 by Bluetooth® Low Energy communication. In S1202, user authentication processing is executed based on the login request received in S1101. Specifically, the CPU 131 obtains user authentication information obtained by reading the values of characteristics 1202 through 1204, which are characteristics of the user authentication service 1200. Determination is made whether a matching user account is managed in the user management database stored in the storage 134, based on the obtained user authentication information. If there is a matching user account, authentication is successful. If there is no matching user account, authentication has failed. In S1103, the CPU 131 determines whether to permit login, based on the results of authentication in S1102. In a case where the results of authentication are OK, the flow advances to S1105. In a case where authentication results are NG, the flow advances to S1104. While a case of using a user management database within the MFP 101 is exemplified here, this is not restrictive. For example, an external LDAP (Lightweight Directory Access Protocol) server or the like can be used for user authentication. In this case, the MFP 101 transmits the user authentication information to the LDAP server, and commissions the LDAP server to perform user authentication processing. The MFP 101 can determine whether to permit login, based on the result of authentication received from the LDAP server.

In S1104, the CPU 131 updates the authentication results and notifies the mobile terminal of the authentication results. The CPU 131 writes information indicating login failed to ResultID 1206. When a value is written to ResultID 1206, the communication terminal 102 is notified that a value change has been performed by Notification in ATT. Upon completion of the processing in S1104, the series of processing when receiving a login request ends. In addition to notifying the mobile terminal, the CPU 131 displays a pop-up on the operating unit 136 to provide notification that login has failed.

In S1106, the CPU 131 displays the main screen on the operating unit 136. The user can use the MFP's 101 functions via the main screen displayed on the operating unit 136. The screen displayed in S1105 can be appropriately changed depending on the authority of the user logging in, or individual settings of the user logging in. According to the series of processing described so far, the user can login to the MFP 101 by simply holding the user's communication terminal 102 up to the MFP 101, instead of performing operations such as inputting user ID and password in a case of logging into the MFP 101.

Next, in S1106, the CPU 131 performs updating of authentication results, updating of local login information, and notification of the authentication results to the mobile terminal. The CPU 131 writes a value indicating login successful to ResultID 1206. When a value is written to ResultID 1206, the communication terminal 102 is notified that a value change has been performed by Notification in ATT. The CPU 131 also writes "2" to the StatusID 1201 as local login information. When the processing is completed, the flow advances to S1107.

In S1107, the CPU 131 determines whether a user instruction has been accepted via the operating unit 136 to execute a function. In a case where a user instruction has been accepted via the operating unit 136 to execute a function, the flow advances to S1108. In a case where a user instruction has not been accepted via the operating unit 136 to execute a function, the flow advances to S1109.

In S1108, the CPU 131 executes functions based on user instructions. For example, copy functions of printing an image obtained by scanning an original at the printing unit 140, facsimile function of transmitting an image obtained by scanning, and so forth, are executed based on user instructions. When execution of functions is completed, the flow advances to S1109.

In S1109, the CPU 131 determines whether an instruction to logout the user has been accepted. In a case where an instruction to logout the user has been accepted, the flow advances to S1110. In a case where an instruction to logout the user has not been accepted, the flow returns to S1107.

In S1110, the CPU 131 performs logout processing and updates the local login status. "1" indicating login enabled is written to the StatusID.

In S1111, the CPU 131 displays a login screen (not illustrated) on the operating unit 136 and ends the series of processing.

As described above, appropriate notification control is performed in a case of logging in from a communication terminal to an external device in the present embodiment so user convenience can be improved. Also, according to the present embodiment, the function of cooperative login with the communication terminal 102 enables the user to be appropriately notified of various error factors occurring due to combinations of settings of devices, statuses of devices, and so forth.

The user can be notified in each step in FIG. 9, so the user can be notified at an early stage in the sequence of performing login processing. Accordingly, useless user operations can be suppressed from being performed. Thus, according to the present disclosure, a framework can be provided to improve user convenience in a case of logging into a nearby external device from a communication terminal.

In another aspect of the present disclosure, a framework can be provided that suppresses unnecessary user operations from being performed in a case where settings used for login processing have not been appropriately made by notifying the user before a login request is made.

Modification

In the above-described embodiment, the local login state is confirmed in S1011 in FIG. 10, and in a case where a user has already logged in, local login using the communication terminal 102 fails. The present disclosure is not restricted to this. For example, in another embodiment, a configuration can be provided where, even in a case where a user previously logged into the MFP 101, local login using the communication terminal 102 is given priority. In this case, the communication terminal 102 writes a logout request to Request ID 1205 to cause the MFP 101 to logout the user currently logged in. Subsequently, the processing of S1013 and thereafter can be re-executed.

In the above-described embodiment, the degree of closeness of an external device, such as an MFP that is in the vicinity of the communication terminal 102, is determined using received signal strength of advertising packets, but this is not restrictive. For example, the distance between devices can be estimated from the ratio between the transmission signal strength (Tx) contained in the advertising packets and the received signal strength, and determination be performed regarding the degree of closeness based on the distance. The degree of closeness between the communication terminal 102 and an external device to be logged into can be determined using other formats, such as, for example, Wi-Fi Aware™ or the like.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-100154, filed May 19, 2017, which is hereby incorporated by reference herein in its entirety.

What is claimed is:

1. A method executed by a communication terminal configured to receive a setting to enable or disable execution of a Bluetooth function, the method comprising:
    displaying a first screen including a selectable object on a display of the communication terminal;
    displaying a second screen to prompt a user to enable the Bluetooth function on the display of the communication terminal on condition that the Bluetooth function is disabled in response to a selection instruction to select the selectable object;
    receiving the selection instruction to select the selectable object, and displaying a third screen to prompt a user to bring the communication terminal closer to a transmission destination printer to which a login request is transmitted by Bluetooth communication on condition that the Bluetooth function is enabled; and
    displaying a fourth screen to prompt a user to perform sensitivity adjustment of the communication terminal in a case where the transmission destination printer is not found on the third screen.

2. The method according to claim 1, wherein in a case where the transmission destination printer is found on the third screen, the communication terminal does not display the fourth screen but transmits the login request to the transmission destination printer by the Bluetooth communication.

3. The method according to claim 1, wherein a message to prompt a user to perform the sensitivity adjustment and a key to perform the sensitivity adjustment are simultaneously displayed on the fourth screen.

4. The method according to claim 1, further comprising:
    determining whether the communication terminal is set in such a way that the Bluetooth function is enabled when the selection instruction is received; and
    displaying the third screen on the display in a case where a result of determination is that the Bluetooth function is disabled.

5. The method according to claim 1, wherein the Bluetooth function conforms to Bluetooth Low Energy specifications.

6. The method according to claim 1, further comprising performing the Bluetooth communication using a Generic Attributes (GATT) profile of the Bluetooth function between the communication terminal and the transmission destination printer.

7. The method according to claim 1, wherein the method is implemented in accordance with an application run on an operating system (OS) of the communication terminal.

8. The method according to claim 1, wherein the second screen is a screen that includes a notification superposed on the third screen.

9. The method according to claim 1, wherein the first screen is a menu screen.

10. The method according to claim 1, wherein the first screen is screen for specifying one function from a plurality of functions.

11. The method according to claim 10, wherein the plurality of functions includes a login function, and further includes at least one of a function related to printing, a function related to scanning, a function related to a camera, and a function related to transmission of an address.

12. The method according to claim 11, wherein the function related to printing includes at least one of a function of transmitting image data or document data held by the communication terminal and a function of giving an instruction to print a document held by the printer.

13. The method according to claim 12, wherein at least one function different from the login function of the plurality of functions is a function of using Wi-Fi communication.

14. The method according to claim 1, wherein the selectable object is a login function button.

15. The method according to claim 14, wherein the login function button does not include description about Bluetooth.

16. The method according to claim 1, further comprising: causing the display of the communication terminal to display a setting screen for setting authentication information to be used for the login request, the authentication information including at least one of a user ID and a password.

\* \* \* \* \*